United States Patent [19]
Breslin

US005321610A

[11] Patent Number: 5,321,610
[45] Date of Patent: Jun. 14, 1994

[54] INTEGRATED PRODUCT FOR IMPLEMENTING APPLICATION SOFTWARE AND PROCESS OF DEVELOPING INTEGRATED PRODUCT FOR IMPLEMENTING APPLICATION SOFTWARE

[75] Inventor: Jud Breslin, Mountain View, N.J.
[73] Assignee: The Cobre Group, Inc., Norristown, N.J.
[21] Appl. No.: 764,368
[22] Filed: Sep. 23, 1991
[51] Int. Cl.⁵ ............................................. G06F 15/38
[52] U.S. Cl. .............................. 364/419.19; 364/468; 364/401
[58] Field of Search ................ 364/419, 468, 401, 402

[56] References Cited
U.S. PATENT DOCUMENTS

| | | | |
|---|---|---|---|
| 5,053,970 | 10/1991 | Kurihara et al. | 364/468 |
| 5,089,970 | 2/1992 | Lee et al. | 364/468 |
| 5,093,794 | 3/1992 | Howie et al. | 364/468 |

Primary Examiner—Roy N. Envall, Jr.
Assistant Examiner—Khai Tran
Attorney, Agent, or Firm—Aufrichtig Stein & Aufrichtig

[57] ABSTRACT

A process for developing an integrated implementation product for implementing large packaged application software produces four integrated components. The integrated implementation product includes a plan component, a training component, an user component and a data conversion component. Together, these components speed the implementation of large application software into an user company's computer system by reducing confusion, improving resource allocation and maximizing functionality utilization of the application software. In addition, there is a methodology for developing the integrated implementation product utilizing a seven phase design and development process. A process is utilized to implement a package software application onto an user's system and into the user's procedures through the use of an integrated implementation product which assists in the implementation and training of employees.

18 Claims, 24 Drawing Sheets

| PLANNING TASKS | | AUTOMATED PRODUCTS |
|---|---|---|
| 1.000 | PRE-ASSESSMENT | |
| 2.000 | ORGANIZATION & PLANNING | PLAN |
| 3.000 | RESPONSIBILITY & TIMETABLE | PLAN (PERSONALIZED) |
| 4.000 | CURRENT ENVIRONMENT | USER |
| 5.000 | NEW USER PROCEDURES | USER (PERSONALIZED) |
| 6.000 | INITIAL USER EDUCATION/TRAINING | TRAINING |
| 7.000 | CONFERENCE ROOM PILOT | TRAINING (PERSONALIZED) |
| 8.000 | CONVERSION PLANNING/TESTING | DATA |
| 9.000 | CUT-OVER | DATA (PERSONALIZED) |
| 10.000 | POST-ASSESSMENT | |

| PLANNING TASKS | | AUTOMATED PRODUCTS |
|---|---|---|
| 1.000 | PRE-ASSESSMENT | |
| 2.000 | ORGANIZATION & PLANNING | PLAN |
| 3.000 | RESPONSIBILITY & TIMETABLE | PLAN (PERSONALIZED) |
| 4.000 | CURRENT ENVIRONMENT | USER |
| 5.000 | NEW USER PROCEDURES | USER (PERSONALIZED) |
| 6.000 | INITIAL USER EDUCATION/TRAINING | TRAINING |
| 7.000 | CONFERENCE ROOM PILOT | TRAINING (PERSONALIZED) |
| 8.000 | CONVERSION PLANNING/TESTING | DATA |
| 9.000 | CUT-OVER | DATA (PERSONALIZED) |
| 10.000 | POST-ASSESSMENT | |

FIG. 1

```
SCHEDULE NAME    :
RESPONSIBLE      :
AS OF DATE       : 3-JUL-91          SCHEDULE FILE : TCGPLAN 91                                        92
                          EFFORT      JAN FEB MAR APR MAY JUN JUL AUG SEP OCT NOV DEC JAN FEB MAR APR
TASK NAME       RESOURCES (DAYS) N    2   1   1   1   1   3   1   3   1   2   1   2   2   2   2   1
START UP                  0           M   .   .   .   .   .   .   .   .   .   .   .   .   .   .   .
+1. PRE-ASSESSMENT        23          ##  .   .   .   .   .   .   .   .   .   .   .   .   .   .   .
+2. PLANNING & ORGANIZATION 51        .######### .   .   .   .   .   .   .   .   .   .   .   .   .
+3. GOALS AND OBJECTIVES  27          .   .###  .   .   .   .   .   .   .   .   .   .   .   .   .
+4. PROJECT TEAM EDUCATION 108        .   .   .   .   .   .   .   .   .   .   .   .   .   .   .   .
+5. CURRENT/NEW USER ENVIRONMENT 363  .   .   .########################.   .   .   .   .   .   .
+6. HARDWARE/SOFTWARE INSTALL 98      .   .   .   .   .   . ——————————— .   .   .   .   .   .   .
+7. DATA CONVERSION & TESTING 332     .   .   .   .   .   .########################### .   .   .
+8. USER TRNG/PREPROD SCENARIOS 54    .   .   .   .   .   . ——————————— .   .   .   ####### .   .
+9. CUTOVER PLANNING/LIVE OPS 87      .   .   .   .   .   .   .   .   .   .   .   . ######### .
+10. POST ASSESSMENT REVIEW 49        .   .   .   .   .   .   .   .   .   .   .   .   .   . #####

XXXXX DETAIL TASK    ##### SUMMARY TASK    ***** BASELINE
xxXXX (PROGRESS)     =### (PROGRESS)       >>> CONFLICT
XXX-- (SLACK)        ##-- (SLACK)          ...XXXRESOURCE DELAY
PROGRESS SHOWS PERCENT ACHIEVED ON ACTUAL  M MILESTONE
------ SCALE: 5 DAYS PER CHARACTER

TIME LINE GANTT CHART REPORT, STRIP 1      TIME LINE GANTT CHART REPORT, STRIP 2
```

FIG. 3

HELPMATE JOB DESCRIPTION
A/P CLERK

| PRIMARY RESPONSIBILITY | THE PRIMARY RESPONSIBILITIES OF THE A/P CLERK ARE TO INPUT ENTRIES, CORRECT AND EDIT INPUTS, GENERATE DAILY PROOF LISTS AND MANUALLY BATCH AND MATCH INVOICES, PURCHASE ORDERS AND RECEIVERS. |
|---|---|
| PRIMARY COMPUTERIZED PROCEDURES | PRIMARY MANUAL PROCEDURES |
| ☐ A/P ENTRY AND EDIT  (705)<br>☐ DAILY A/P PROOF  (706)<br>☐ REPORTING  (707)<br>☐ PURCHASE RECONCILIATION  (708)<br>☐ REVIEW CLOSING PARAMETERS  (709)<br>☐ A/P END OF MONTH  (710) | ☐ BATCH INVOICES<br>☐ MATCH PO/INVOICE<br>☐ MATCH INVOICES/RECEIVERS |

HELPMATE MIGRATION PATH: TCG (110) — USER (112) — A/P (113)

FIG. 17

FIELDS WORKSHEET

FILE: ARARP100  NUMBER OF FIELDS:  FIELDS

| | | |
|---|---|---|
| 1 | ACTIV | ACTIV CODE |
| 2 | CMPNO | COMPANY NUMBER |
| 3 | PLTNO | PLANT NUMBER |
| 4 | ARRCD | RECORD CODE A,C,F,I,P |
| 5 | CUSNO | CUSTOMER NUMBER |
| 6 | INVNO | INVOICE NUMBER |
| 7 | CCUS # | CORPORATE CUSTOMER NUMBER |
| 8 | BATCH | BATCH NUMBER |
| 9 | ARTMN | TRANSACTION DATE - MONTH |
| 10 | ARTDY | TRANSACTION DATE - DAY |

NEXT
PREV
PGDN
PGUP
EXIT

CURRENT DATA

FIELDNAME: ACTIV
FILE:      ARARP100
FORMAT:    RAR100
TYPE:      A
LENGTH:    1
WIDTH:
DECIMALS:  0
OFFSET:    0
REQ:
MAINT.:

PRINT WORKSHEET    HELP

FIG. 25

INTEGRATED PRODUCT FOR IMPLEMENTING APPLICATION SOFTWARE AND PROCESS OF DEVELOPING INTEGRATED PRODUCT FOR IMPLEMENTING APPLICATION SOFTWARE

BACKGROUND OF THE INVENTION

The invention is generally directed to an integrated product for implementing a specific system or packaged application software and a process for developing the integrated product for implementing the specific system or application software. In particular, the invention is directed to an integrated product for better defining the functionality and reducing the cost and time to implement complex application software. The integrated product includes implementation planning, data conversion, user documentation and user training components for implementing application systems. The integrated product is created by following a process for analyzing the application and developing an integrated implementation package for the application software. The design portion of the integrated product is developed after a review of the functional requirements.

As the computer industry has grown, the size and complexity of packaged application software has likewise grown. This complexity is particularly troublesome for companies, and other large governmental, educational and commercial institutional computer users, which rely heavily on company or division-wide systems that require large investments in information systems management and tools.

For example, manufacturing companies must maintain accurate, effective and readily accessible inventory records for materials utilized in manufacturing processes to implement newer and more improved inventory handling processes to effectively manage the company and the business. It is critical that the required information be available to manage in a real time environment. Many management systems are obsolete and fail to provide the support necessary for management to effectively manage. For the inventory system to be useful it must make the data relating to existing inventory, manufacturing activities and production plans accessible to the appropriate department or individuals in charge of coordinating procurement, transportation of materials and process manufacturing. In addition, various levels of management will need access to the information on a periodic basis (monthly reports) and even on-line for control and management purposes.

The software guides the operation of the business and all activities related to the business. The computer system must allow access to various types of information by different people, some of whom may input or modify data, while others will be limited to accessing all or some limited portion of the data. The information systems also generally include various report features tailored to the specific needs of the user company or entity and to the varying needs of people actually using the system.

Most of these large computer systems and the related information systems are managed by management information system (MIS) departments which specialize in managing the systems and applications software. They provide the information stored in the systems to the different levels of management in a timely fashion and a useful form through the application software. This application software is developed in house or purchased from third party vendors who sell application packages.

The in-house design approach requires the user companies or institutions to maintain huge MIS staffs which spend years working on projects, many of which, due to poor designs or rapidly evolving changes in corporate needs, or substantial improvements in existing computer hardware and software, are obsolete before they can even be implemented.

During the various waves of cost cutting by large corporations and by institutions and governmental agencies and bodies, the large MIS departments came under severe attack for the often wasteful addition of regular staff for a single project. Generally, after the project was completed, whether successfully or not, the employees stayed on and bloated the ranks of the company.

Now, the ever increasing pace of improvements of hardware and software have been so pervasive and continuous and the costs of maintaining in-house development teams has become so high that it is now somewhat unusual to find companies or institutions which have sufficient additional internal MIS resources to develop, design and implement a custom software package for use with major company information systems in a mainframe environment. Even where such resources exist, the companies and institutions cannot afford the leisurely pace of design and development which previously existed. They need to streamline the design, development and implementation process and require outside assistance.

As a result, independent software developers have grown and now provide the manpower necessary to design, develop and debug major software systems with broad functionality. Generally, these companies examine the market for large scale products which may be sold to a number of different companies or institutions sharing similar needs and requirements.

Due to the widespread increase in uniformity of the installed hardware and operating system software and the cost to develop systems, the packaged application software industry has shifted from developing application software customized for, and intended to be exclusively used by, a particular user having specific needs, to creation of packaged application software which is developed with the needs of a broad range of potential user companies in mind. To meet this broadened market, broad ranges of functionality are added to the packaged application software so that the software package does anything that any user might wish to do with the system.

However, within this philosophy of development are the seeds of a nightmare for a purchasing user's MIS department. A manufacturing software package may include many different features of which only a select few are useful, necessary or appropriate in the user's environment. To determine which features are to be used, or mask features not be implemented, to customize the software so that it is optimized for the features selected and to convert from an existing manual, computer based or hybrid system to the new application software are monumental tasks.

Implementation of application software, which includes a planning phase, a data conversion phase, an installation phase and a user training phase is a particularly labor intensive process. Upon implementation the user must actually use the system in its business and operate in the environment created b the new system. If the implementation of the system does not succeed, either because the program does not do what it is supposed to do or because the employees are not properly trained and understand how to use the system correctly or efficiently in the context of their job responsibilities, the entire company will suffer greatly.

From the first step in the software development life cycle—determining the conceptual need—through implementation and operation, it is also a very expensive process. It is not unusual that as much as 80% of a software application's costs to an acquiring company are associated with its implementation. Users must make substantial commitments of time and personnel and often choose to contract for costly outside assistance to successfully customize and implement an application package. It is not uncommon for a company to hire independent computer consultants to work on the implementation of a large software package for one or two years. With all of these costs and the time involved, successful implementation is not always assured.

Despite the broad functionality often added to packaged application software, the user often finds that the package actually meets only 80% of its specific needs. The user must change the way it works and/or the software must be modified to fit a user's additional or different needs in order to satisfy the remaining 20%. In addition, most users either don't understand all of the functions of the packaged application software that are available or aren't aware of the existence of these features. Functions are seldom clearly defined but rather are presented in volumes of user documentation, menus and screens. Functions applicable to a process manufacturer for example, may have no relevance to a discrete manufacturer.

Static user documentation does not allow tailoring of the procedures and training of the packaged applications software to each user company's different needs and the needs of each of the individuals at the user company involved in utilizing the software. Misunderstandings between users and developers about the functionality of the software package are common. Misunderstandings and poor communications between the MIS department of a user company and the groups or divisions using the software are even more common.

Software vendors, as do sellers of other products, oversell their products, promising functionality but not defining the exact nature of that functionality. Users also add confusion because they fail to understand what functionality they require. This greatly increases the difficulty of implementation. Increased implementation problems convert directly into a larger time to implement the software, substantially increased direct and indirect costs and decreased use of available functionality. Decreased functionality, unfortunately, also translates into reduced financial performance as the business is not operating in an efficient manner.

Generally, the documentation provided by packaged application software developers is either unusable or unused. Generic application software package developers, as with most software developers, are more concerned with producing a functioning product than preparing comprehensive and useful documentation. On the other hand, much documentation provided is so voluminous that it is not usable by the staff actually using the program once it is installed. Documentation is almost always an afterthought and most frequently written by individuals other than the software developers. Actual users are unlikely to consult massive user manuals. In addition, the documentation is not always current or even more importantly written from the user's perspective. No user oriented functional statements have existed before this invention.

Finally, the user company's bottom line is rarely impacted as positively as is originally forecasted either by the packaged software developer or the user's MIS department. Generally, the promised functionality is either not effectively implemented into the user company's method of doing business or unimplemented features must be done manually or through a secondary system which does not allow the expected efficiencies of an integrated system. In addition, there is a substantial loss of efficiency as the business is adapted to the new system. There is also a substantial maintenance burden which is added to the MIS department to keep the new system functioning.

Due to the intensely competitive nature of the packaged software development industry, the challenge for application software developers is to address these realities and to differentiate their offerings from their competitors. For users the challenge is eliminating these complications in order to achieve the operational and financial goals they set when acquiring the application package.

Thus, there is a great need for a tool or set of tools which will allow a user company to efficiently implement a application software package by: evaluating the offered and needed functionality; planning the implementation schedule based on realistic appraisals of time and personnel requirements; training personnel in a reliable and convenient fashion which is tailored to the functionality of the software actually implemented; and providing documentation which is accessible, convenient and tailored to the implemented functionality. Most importantly, the bottom line is for users to actually use the application in the way it is intended to be used to control and operate the business.

Companies which choose to develop, design and implement large software systems internally, spend a great deal of time, money and employee resources determining what types of features should be included in an industry specific system. Accordingly, there is a need for a set of integrated software tools and methodology to address the problems inherent in implementing packaged software so that implementation time and cost is reduced, use of such packages simplified and users gain a cost effective, timely implementation and greater use of more application functions resulting in maximum return on their investment. There is also a need for the integrated software tools and methodology to aid design, development and testing of software systems and modifications, and then utilize the integrated software tools which are customized during the design and development phases in the implementation phase.

SUMMARY OF THE INVENTION

Accordingly, it is an object of the invention to provide an improved integrated implementation product for implementing packaged application software by a user.

Another object of the invention is to provide an improved process for developing an integrated product which improves implementation of packaged application software.

Another object of the invention is to provide an improved implementation product, which when combined with an implementation methodology, allows user companies to quickly, efficiently and inexpensively implement packaged application software.

A further object of the invention is to provide improved project planning for implementation of packaged application software.

Still another object of the invention is to provide an improved process for developing project management control for the implementation of application software.

Still a further object of the invention is to provide improved user documentation for implementation and use of a customized application software package so that needed information may be retrieved in an efficient manner and in a useful form for a wide variety of different user needs and questions.

Still another object of the invention is to provide an improved process for customizing user documentation to the features and functionality implemented in a customized application software package at a specific user company.

Yet a further object of the invention is to provide an improved training system for use in connection with a customized application software package implemented and installed or to be implemented and to be installed in a user company.

Yet a still further object of the invention is to provide a process or methodology for developing a training application package for a user company's specific implementation of packaged application software which is tailored to the functionality actually implemented.

Yet another object of the invention is to provide an improved data identification and tracking software tool for analyzing the data conversion needs of a user company in shifting from an existing software or paper procedure to a new application software package.

Still another object of the invention is to provide a process or methodology for identifying and tracking data conversion from an existing computer system or manual system to a application software package so that data conversion and creation can be optimized.

Yet another object of the invention is to provide a process or a methodology for building conversion plans and specifications for a application software package.

Another object of the invention is to provide an improved set of software tools utilized in connection with a methodology to address the problems inherent in implementing packaged software so that the implementation time is reduced, use of the package is simplified, users gain a cost-effective, timely implementation and greater use of more application functions resulting in maximized return on the investment in the new software.

A further object of the invention is to provide an improved integrated PC-based implementation package incorporating project planning, user documentation, training and data identification and tracking components for simplifying the implementation of mainframe and minicomputer software applications.

Yet another object is to provide a data repository of all files and data elements within a system.

Still another object of the invention is to provide a process for implementing and maintaining a mainframe- or minicomputer-based packaged application software with a PC-based series of software tools utilizing a graphical user interface.

Yet a further object of the invention is to provide a graphical user interface-based series of tools to aid in the implementation of a mainframe- or minicomputer-based application software package.

Yet another object is to incorporate all applicable software (spreadsheets, word processors, emulators), usable in the implementation process under one graphics umbrella to better illustrate the application package.

Still other objects and advantages of the invention will in part be obvious and will in part be apparent from the specification.

The invention accordingly comprises the features of construction, combinations of elements, and arrangements of parts, as well as the steps, methods and activities which will be exemplified in the constructions and processes and methodologies hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a graphical view of a list of tasks and automated tasks in accordance with a preferred embodiment of the invention;

FIG. 3 is a summary Gantt Chart of the phases of implementation in accordance with a preferred embodiment of the invention;

FIG. 17 is a graphical view of a job description screen in the user component in accordance with a preferred embodiment of the invention;

FIG. 25 is a graphical view of a fourth level screen in the data conversion component in accordance with a preferred embodiment of the invention.

DETAILED DESCRIPTION OF THE PREFERRED EMBODIMENTS

Figure 2:
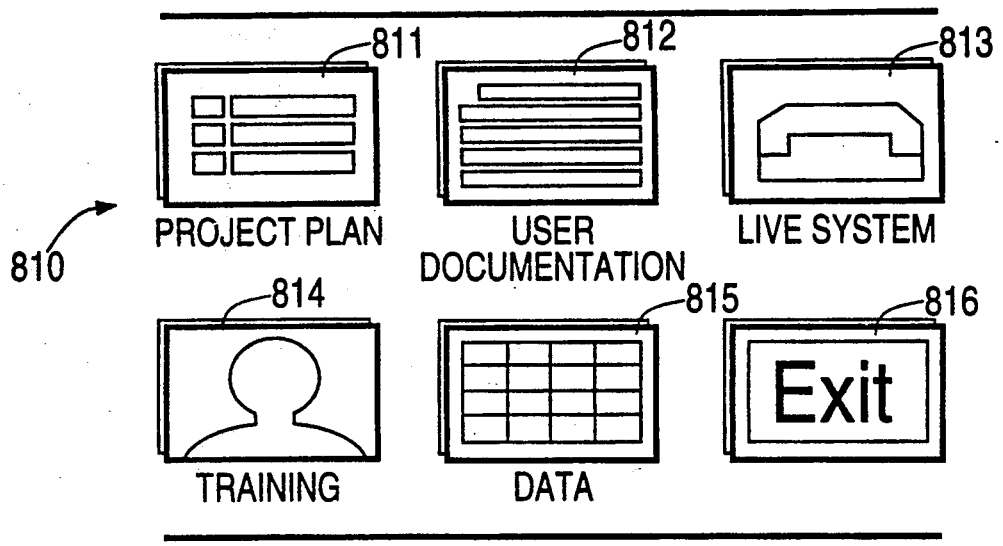
FIG. 2 is a graphical view of an entry screen in accordance with a preferred embodiment of the invention.

The implementation of a major software product into a user company's computer system can have a monumental effect on the operations and financial status of the user company. If the implementation is not efficiently handled the effect on the financial bottom line of the company can be severe and negative. This potential for substantial financial harm is particularly severe in large corporate or institutional settings where the business affected by and managed by the software exists on a scale requiring the largest mainframe or mini- computers for meaningful control and manipulation(so-called mission critical systems).

Most of the major corporations, institutions, and governmental agencies and bodies have internal management information system (MIS) departments set up to create, develop and manage the software utilized by these entities on an ongoing basis. Often, however, management determines that the capabilities of existing application systems and database management systems are inadequate, outdated or inefficient in utilization of resources, personnel or for safety reasons. In addition, as the capabilities of computers have advanced and continue to advance and the size and scope of the information contained in the databases grows at almost geometric rates, the software used to create, modify, control and analyze the data in connection with programs which control inventory, manufacturing, distribution, sales, financial returns and the like must be constantly updated and improved to provide the needed functionality in an efficient, rapid and cost effective manner at the lowest possible personnel and financial costs. In addition, the cost of maintaining the existing systems grows over time and entire organizations within the companies grow merely to keep the existing systems running. Often, these support staffs serve no positive role in increasing the bottom line of the company, and are merely expensive overhead associated with the management systems which would be made extraneous with new software systems.

Traditionally, MIS departments expanded to include large numbers of systems analysts and designers as well as computer programmers, of various types. Typically, analysts analyze company needs for program functionality, design a system which incorporates the functionality and is set to handle the expected capacity of the system, write and debug the actual computer programs and then implement the finished system.

With this design approach the software, when designed and finally debugged, generally several years after the initiation of the development programs, would be implemented by the MIS department with a complete understanding of the particular needs of the systems and the functionality provided. Implementation of these systems was generally orderly and without major problems, assuming that the program had been properly debugged and tested during its development phase. This was so because implementation into the actual user environment was considered at each step in the development process and the staff required to perform functions in the implementation phase as involved during the design and development phase.

However, this design approach required the user companies or institutions to maintain huge MIS staffs which spent years working on projects, many of which, due to poor designs or rapidly evolving changes in corporate needs, or substantial improvements in existing computer hardware and software, were obsolete before they could even be implemented.

During the various waves of cost cutting by large corporations and by institutions and governmental agencies and bodies, the large MIS departments came under severe attack for the often wasteful addition of regular staff for a single project. Generally, after the project was completed, whether successfully or not, the employees stayed on and bloated the ranks of the company.

Now, the ever increasing pace of improvements of hardware and software have been so pervasive and continuous and the costs of maintaining in-house development teams has become so high that it is now somewhat unusual to find companies or institutions which have sufficient additional internal MIS resources to develop, design and implement a custom software package for use with major company databases in a mainframe environment. Even where such resources exist, the companies and institutions cannot afford the leisurely pace of design and development which previously existed. They need to streamline the design, development and implementation process and require outside assistance.

As a result, independent software developers have grown and now provide the manpower necessary to design, develop and debug major software systems with broad functionality. Generally, these companies examine the market for large scale products which may be sold to a number of different companies or institutions sharing similar needs and requirements. These programs are often developed with one particular user-company or institution in mind and the development costs are often underwritten to some extent by that single entity. The independent software development companies, while attempting to assure their successful development of packages by insuring at least one pre-development purchaser, examine the needs of the market in a broader context and develop as much functionality as may be reasonably needed by any of the various target purchasers of the software. Thus, by the time the software is developed and debugged, it includes functionality far in excess of that which will be utilized by any single user. Generally, the documentation associated with the finished software is either non-existent, grossly inadequate or unintelligible on the one hand or so massive and unwieldy as to be effectively useless on the other hand.

Thus, in the current environment, a large corporation or institution looking to upgrade an existing manufacturing, management control or integrated financial management software packages would ordinarily look to existing software developer/vendor companies to see what is available in the marketplace. Generally, none of the existing software packages provides precisely the functionality or the exact manner of operation desired by the company or institution.

The software product eventually selected is picked as a best fit which will require substantial adaptation of the software to the user company's procedures and organization and vice versa. There will be both software modification and user company procedures modification.

The implementation process, rather than being an orderly and prepared step in the development of the computer software, as in the customized software situation discussed above, is a pressure laden attempt to squeeze the round computer program into the square user company procedures and existing database systems. To add to this difficult endeavor, management, which has selected the software package, usually on the recommendation of the MIS department, is interested in speedy and inexpensive implementation of the software so that the company or institution's bottom line is given a positive push. Delays in implementing the software and discovery that certain functionality, which was critical to the selection of the product, does not work or cannot be implemented because of system conflicts or incompatibility, often causes substantial disarray within the user company or institution and a substantial negative effect on the bottom line.

Thus, a critical and much needed component to a large packaged software product is an implementation product which eases the introduction of the product into the company's user environment.

With reference to the various figures identified below, in a preferred embodiment, an integrated implementation product in accordance with the invention includes four components: a planning component; a training component; a user documentation component; and a data conversion component.

Reference is made to FIG. 1 wherein a graphical overview of the tasks which are required to implement a application into a user's existing or to be created computer environment is depicted. As seen in FIG. 1, the implementation includes ten separate phases and the underlying activities and tasks needed to implement an application.

With reference to FIG. 1, phase one is the pre-assessment step which is utilized to prepare the user company or institution for the implementation. This phase includes the selection of the packaged application software. Numerous activities, which in turn include a series of tasks, defined by the time, resources, costs and dependencies involved, are encompassed within this phase, as well as each of the other nine phases.

During the second phase the MIS Department evaluates what will be necessary to implement the new software package both in terms of computer resources and personnel resources. The plan component of the integrated implementation product is utilized during this phase. Next, the third phase, which is entitled "responsibility and timetable," is the period when the plan, which is "personalized" in phase two to the specific functionality selected for implementation by the user company and the expected resources to be allocated is used. The generic version of the plan includes an implementation template which is created based upon prior implementations of the software package and discussions with the software developers regarding the time, resources and dependencies (i.e., the order in which events should occur), required to implement the application software. The MIS Department, during the responsibility and timetable portion of the implementation, work with the plan component of the integrated product to "personalize" it to the particular user company's needs including its specific resources and the functionality which will be implemented.

Similarly, during phases 4 and 5 (fit analysis), the current environment and new user procedures, the user component of the implementation product is utilized. First, during phase 4, the generic version of the user component is utilized and "personalized" to the user company's personnel and procedures. Next, during phase 5, the user component is utilized and further tailored. In phases 6 and 7, the initial user education/training and conference room pilot phases of the implementation are developed. First the generic training component is utilized and modified to produce the "personalized" training component which is then utilized to provide initial user training and finally conference room pilot scenario training. During phases 8 and 9, the conversion planning and testing and the cut-over phases, respectively, the generic and "personalized" data components of the integrated product are utilized. First, the generic data conversion component is used and modified to chart the conversion needs and when populated by the MIS department and user departments is used to identify data in the form required by the new software. Finally, the post-assessment phase is used to evaluate the implementation in terms of performance goals.

Typically to build a detailed implementation plan can take at least three to four months of concentrated activity. With the implementation product this time period can be shortened to a two to three week period and management can participate in the control process more closely. Tasks and assumptions sets are built. For example, in the case of a branch banking system, the assumption set is built depending upon a number of different variables which change depending upon the implementation. These variables would include the number of branches, the number of employees, the dollar volume controlled and the number of people in the MIS department. Changes in the variables change the resources and schedules of tasks which must be performed. Thus a change in the assumption set changes the task.

The changes which are made in the tasks associated with each phase of the implementation based on the assumption set highlights the strengths of the implementation product and methodology. The implementation product provides a structure and basic set of assumptions which are related to the implementation phases, activities and tasks so that a change in the assumption set automatically results in a corresponding change in the time of the total project.

A. A DEVELOPING THE IMPLEMENTATION PRODUCT

First, we will focus on the methodology utilized to develop and prepare the integrated implementation product. This includes the development of each of the four major components and the manner in which they are integrated. There will also be a discussion of the way in which the generic components are personalized by the user in the implementation process. Then there will be a description in detail of the functionality and manner of operation of each of the separate components. This ability to "personalize" the generic components to each user company's situation is critical and novel to the implementation product in accordance with the invention. Thus, a single generic implementation product then will be personalized in different ways by different companies.

The development methodology for developing an integrated product for implementing application software is achieved through a seven phase process. Each phase includes various activities which must be completed prior to the commencement of the next phase. The overall view is to collect all of the software system information, organize it into the structured hierarchy in accordance with the invention, fill the templates designed for each level of the hierarchy, utilize the coding scheme for linking each of the levels of the hierarchy and finalize the structured integrated implementation product.

1. Systems Review Phase

First, in the systems review phase the application and the operating environment of the packaged application software is reviewed. There is a review of all current reference, system and operations documentation as well as an analysis of the existing implementations, if any, of the software into a user environment. This phase is critical to the development process and will also include extensive debriefing of software developers and software developer management in connection with the various steps and procedures which must be followed by a user company to implement the system. In addition, there is an in-depth review of all of the functionality of the packaged software and a collection of all of the operating requirements of the system as a whole and, more importantly, the file, record, field and other data requirements for each aspect of the functionality of the software.

This systems review phase of the development is a critical phase in the development of the product where all of the available information on the product and prior implementation is collated and collected and prepared for analysis and organization. The discussions with developers of the software as well as those having experience in the prior implementation of the software can greatly aid in the development of a useful planning component to the integrated process implementation of the product. The information which is collected in this phase will be structured into a hierarchy in accordance with the methodology and then fit into the templates which are pre-designed to receive relevant information at each of the levels of the hierarchy.

2. The Modeling Phase

The second phase of the development process is the modeling phase in which a prototype for the user documentation component is built and a live demonstration of the features and capability of the integrated product is presented. The four components of the implementation integrated product are: the planning component; the user documentation component; the training component; and the data conversion component. At this phase only the user component will be operational.

Figure 7:
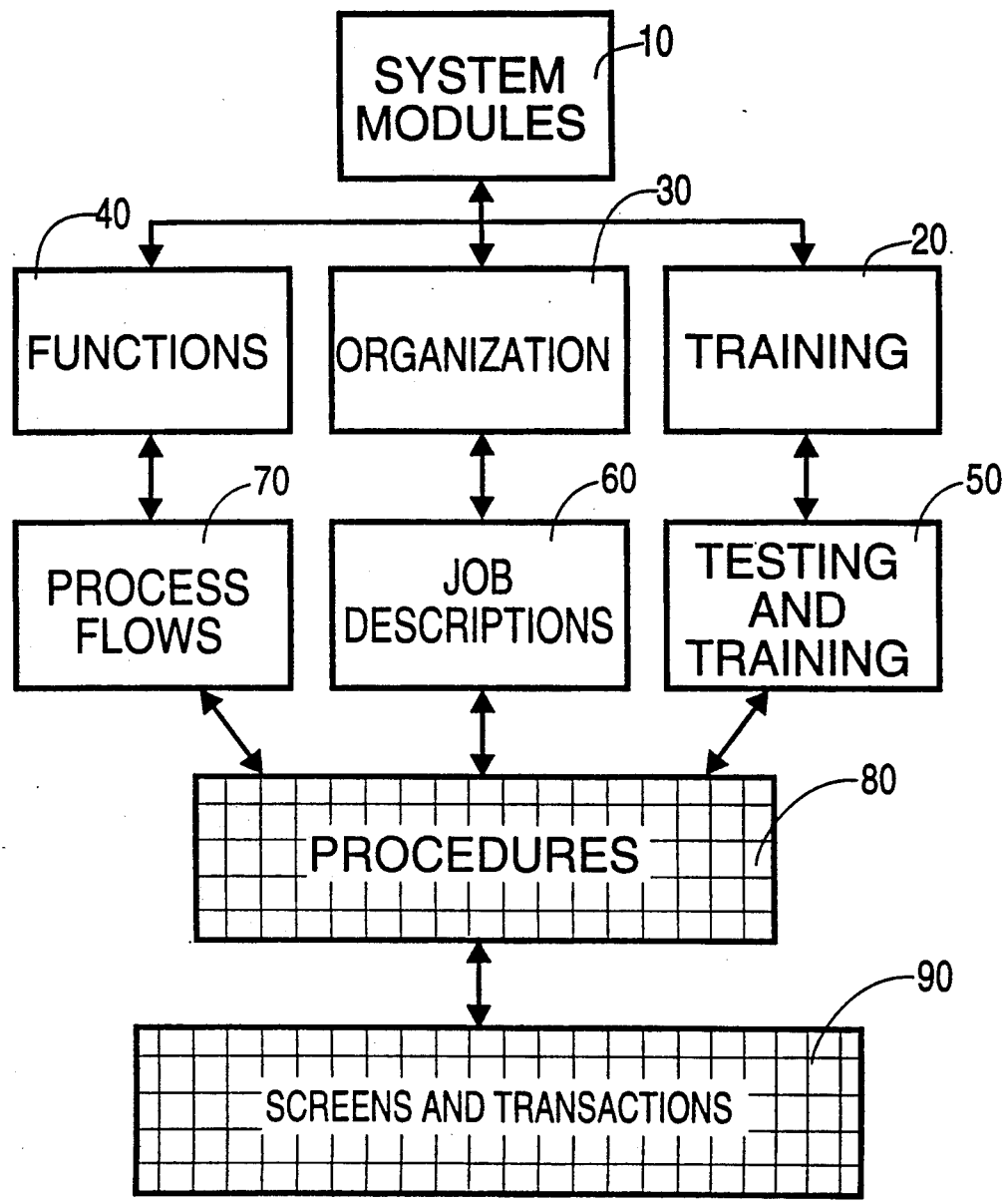
FIG. 7 is a graphical view of the hierarchy in which application software is fit to develop and implement the integrated product in accordance with the invention.

There is a division of the functionality of the software into different levels of detail in accordance with a fixed hierarchy. Reference is made to FIG. 7 which shows this structure in a graphical manner. While not all inclusive, FIG. 7 shows the structure and the three main pathways to access procedures 80 and screens, transactions and reports 90. The access from a system module 10 of the application software is via functions 40, organization 30 and training 20. Functionally one reaches procedures 80 through process flows 70. Organizationally one reaches procedures 80 through job descriptions 60. In the training path one reaches procedures 80 through testing and training 50.

The key to implementation in this modeling phase is the analysis of the application software and the fitting of that software into the structural hierarchy of FIG. 7. By reorganizing the manner in which the application software is viewed through the lens of the hierarchical structure of FIG. 7, the application software is opened up into a clearly organized and useful tool which can be viewed in meaningful ways which vastly improve implementation, training and management awareness of software functioning and employee activities.

At the highest level one finds the application product including the plan, documentation, training and data conversion components. The next level in the user component is the module level where menus are presented for the three primary means of access to the third level which includes function menus for the processes available plus a list of procedures for each function. Process or function flows are the fourth level. These three access routes are by function, by organization and by training scenarios for each module. The training scenario is found in the training component of the plan and will be described below.

The fourth level is where the process flows for each function, process or process flow is shown with detailed, step-by-step flow charts of the tasks to be performed. The process is shown in a fashion which shows how the application actually works from the user perspective (work flow). In addition, a generic organization chart for each function, process or process flow is provided. This fourth level will include a detailed job description for each position having tasks to be performed with the application in the user component. In connection with the training component of the integrated implementation product, scenarios for conference room pilots and for testing would be present. In this level, the steps that must be taken to use each feature of the system are defined. This would include system sign-on, accessing the correct screen, input of required and optional data, editing the data and updating files.

The fifth level is the detailed procedures identified in the process flows. Procedures at the fifth level may be manual or system related at the process flow level but are generally automated procedures. These procedures guide the user from selecting the correct screen, to the data to be input, to the next step the user must take.

The sixth level, is the screens and reports level. This level presents all screens and reports used in the system and describes the use of command keys and function keys.

The development of a comprehensive user component to be demonstrated to the client, whether the client is a software developer or the anticipated user of the software package, is the role of the modeling phase. This user component, as later modified will evolve into the user and training components and form the basis for the data component.

3. Client Review Phase

The third phase of the implementation product development is the client review phase in which the model is shown to the client and the client has an opportunity to review the user component in detail to insure that all the ideas and requirements of the software developer are properly incorporated into the final user component. This phase of the development process is not strictly a separate process but is, to some extent an interactive extension of the modeling phase. During the client review phase changes and improvements are made to the user component of the integrated software product to assure that all of the relevant functionality of the system is properly included within the appropriate hierarchical places in the overall structure and that the details correctly reflect the operation and functionality of the software. Special care must be taken to assure that the organizational breakdown of the functions and tasks and procedures correctly reflects the client's expectations and goals. Where the client is a software developer the organizational information must necessarily be somewhat generic while, if the client is a proposed user company, the organizational chart must track the user company's organizational structure and related responsibilities.

After the client review phase has been successfully implemented and the client is satisfied that the user documentation component powerfully presents the features and capabilities of the software to the user in a useful structure and convenient fashion, this phase of the development approach is completed.

4. Development Phase

The fourth phase is identified as the development phase in which all of the graphic views for the user component are implemented and the planning component is generally structured as a comprehensive but generic plan of all of the tasks, resources and dependencies required for a successful implementation of the planning of the integrated product. This phase really includes two separate parts which are performed at the same time.

The plan starts at a summary level with the ten major phases of implementation of the product commencing with pre-assessment and completing with post-implementation assessment. The plan includes all activities and tasks required for training and for data file conversion. The comprehensive modeling from the second phase and information obtained during that phase in connection with prior implementations are used as the source for the plan tasks, resources and dependencies. The critical first step in this phase is the identification of the process flows (what will be referred to below as the fourth level). Once the functionality of the application has been analyzed and regrouped in a series of process flows, the rest of the structure is easily completed and the planning component is developed based on this structure.

The plan component addresses the problems inherent in developing an implementation plan. Namely, there is an identification of tasks, allocation of resources, setting of a sequence and dependencies of the tasks. To address these issues, the development requires an analysis of three critical elements. First, the specific tasks within the activities required to implement the applications are set forth in the plan based on actual implementation experiences with the product, if available, and based upon detailed debriefing and questioning of system developers. Also, other industry experience with implementation of the system, where available, is of critical importance and is added to increase the intelligence of the assumptions used to create the plan. Second, the resources are identified at the task level to indicate the organization and job title normally assigned the responsibility for executing each of the tasks. Third, the dependencies or recommended sequence for executing the tasks is included in the plan. The phases and activities are generic to the implementation of the software with all functionally operative.

The task, resources and dependencies are input by the developers to reflect the specific component or system to be implemented. This initial plan component may be thought of as a generic template which incorporates all of the tasks, resources and dependencies necessary to implement all of the functionality of the computer software package in a generic company.

The plan component is, in a preferred embodiment, implemented in connection with a high level project management software product which automatically calculates and coordinates the input of the tasks, resources and dependencies to create a plan. It also provides the ability to graphically output the plan as a Gantt chart (which shows the tasks to be performed, the resources associated with that task and the time required to complete the task in a graphical time line along with the other tasks in the implementation), as well as a PERT chart (which shows the interrelationship and dependencies of the various tasks in a graphical fashion). Even more importantly, the project management software, which is commonly available from various vendors, including, for example, the TIMELINE ® product available from Symantec Corp., recalculates the plan as changes are made to the tasks, resources, expected times to complete or actual times of completion of tasks and dependencies.

In this way, as a user company actually utilizes the generic plan component and converts it into a personalized plan customized to the particular functionality to be implemented by a user company and to the organizational structure and resource allocation of the specific company as well as to the dependencies and changes which may be appropriately based upon the specific implementation, the project management software will update the plan so as to incorporate each of these changes. Thus, the plan component is a template which is provided for use with commonly available project management software product which itself is then customizable into a personalized template which provides a customized plan which is used both to plan the initiation of the implementation process as well as to review the manner in which the implementation follows the expected plan and adjusts resources, time expectations and the like as the implementation proceeds. Management is able to follow the progress of the implementation by virtue of the various reports commonly available in the project management software and by comparison of performance with the customized plan template developed early in the implementation process.

Through the use of the generic plan component which is created by the fourth phase a company can develop its own customized implementation plan in a matter of two or three weeks rather than the three to four month period which prevails.

5. Training Phase

The fifth phase of the development approach to produce an integrated implementation product for the computer system is the training phase wherein conference room pilot scenarios and other training components are added. The training component of the integrated implementation product tracks the user component with similar graphical views being presented. The software procedures and functions which are demonstrated and described in the user component are tested in the training component.

The training component is separated out of the comprehensive user component prepared during the second phase of the development process. In addition, conference room pilot scenarios for training the various processes, functions, procedures, screen displays and activity during use of the system are fleshed out and finalized. The testing features are added for each level of detail training. The users are trained and tested so that management can develop a comfort level that the users understand how each process, procedure, screen, transaction and report works and how to use it prior to going live on the system. Scoring or reporting functions are added in a preferred embodiment to provide management with a way to evaluate the levels of readiness of its trainees.

6. Conversion Planning Phase

The next phase of the development process is the conversion planning, or sixth phase of the development process. In this phase, the data conversion plan is developed. The conversion planning component is established as a data conversion component, or data component, which is integrated with the planning component. The conversion tasks and the tasks to use the data component are incorporated into the plan component. They are logically positioned under the phase called conversion planning.

The data components also integrated with the user component. Files and records are cross-referenced to screens and procedures documented in the user and training components. Customers and MIS staff, after reviewing the plan and the user components select the records to review and analyze by system component.

Using the data function which is implemented, customers may select the specific module (i.e., order entry), examine a process, select a specific procedure, highlight a particular screen and then select a specific record (i.e., customer master) for review. The customer may take full advantage of the data conversion component which is developed by comparing its existing record structure with that required by the new system. The conversion component is created by downloading all of the relevant records and their associated fields into a PC-based component for identification of the system's data, tracking of the data throughout the system, analysis of the automated conversion feasibility of each record and, finally, conversion of records.

Identification is a primary role of the data conversion program and this is implemented as an outgrowth of the creation of the user component. The data conversion component is developed by organizing all of the relevant records, bypassing temporary or work records which are irrelevant in the conversion process, into a spreadsheet format.

For each record, the spreadsheet may include the record name and ID number; record description; number of fields; record length; key "identification"; responsibility (the generic department or job title would be inserted with the capability for the user to customize this information to a specific corporate department or responsible job title); and where the record is used (by function, process, process flow, procedure, screen and report).

The record in the data conversion component is also supplemented by the information for each field within a record which would include: field name and ID number; field description; field type (alphanumeric, binary, packed, other user designated); length; from/to location in the record; decimal value; occurrence (how many times this field appears, e.g. a month would normally be twelve); where used (by procedure); required/optional/system-generated identification code; and, field (in memo format) to include specific tables/code values and general comments. This information then becomes critical for the maintenance of the application, data analysis and data conversion.

The second major part of the data conversion component is the tracking component. The tracking component is a two-fold part of the data conversion component. The "where-used" information associated with each record is the first means of tracking the source of and use of the record, and the primary fields within it. The record contains both its maintenance screen and its primary procedure. In addition, the overall record is "assigned" generically to a department (e.g., the chart of accounts records may be the responsibility of the controller's department).

The second consideration of the tracking part of the data conversion component is referred to as the "user-source" designation. The user's input data for each field of information used in the new software. They input the availability of that data from their existing manual or automated systems. Thus, the data component provides the facility to map the current systems onto the new application system, record-by-record and field-by-field. The data input should include: user-source, the source of the field in the existing system (e.g., the inventory file or the manual inventory ledger card); user-auto code, whether or not the user-source is manual or automated; and user-field ID, corresponds to the new system's field including name, ID numbers, type, length, to-from location, decimal value and the current sum.

The resulting data is a field by field comparison of the new system's records with the existing data records. This information will become the input to the conversion plan, the conversion specifications and the basis for analyzing which files can and should be converted.

The third part of the data conversion component which is developed is an automated feature that helps MIS/users to decide logically which records should be converted with a conversion program, which records should be built through the normal day-to-day operations of the system and which records have to be manually created prior to implementation of the system.

This analysis component is set up to logically compare the existing file record and field structure to the file, record and field structure required for implementation and use of the new system. Then, functionality is built in to determine from the comparison whether the existing records may be converted by an automated process (custom or generic conversion computer program) to the required new formatting or whether the existing data must be built on a day-to-day basis during the operation of the new system. Finally, some records may have to be created either in whole or in part manually from an existing automated or manual database. This aspect of the data conversion component is particularly critical and can have a major impact on the planning component. If the preliminary analysis of the data conversion needs are initially miscalculated it may become necessary to implement changes in the resources required to perform the conversion phases of the system implementation to include adequate time and resources to build new files, records and fields which may not be converted to the desired new system formats through automated means.

The fourth part of the data conversion component is the conversion part which consists of a conversion plan and conversion specifications. The plan is an overall sequence and timeline for converting specific records and the specifications are the program or guidelines for creating new files and populating them with their required records in the field. Both of these portions are facilitated by the information contained in the data conversion component and specifically the new records which are required to be created (by conversion and manually). The required fields are mapped against the available data where possible. This part of the data conversion component is developed to provide the capability to sort the information in various ways to develop the conversion specifications. Sorting functions are added to allow sorting by user-source and by where-used variables. The user-source sorting provides a means to gather information on available fields by the source of the data and the sorting by the where-used (by screen within the new computer system) identifies those fields which may have to be input manually.

This part of the data conversion component is also provided with an output function to provide reports, in the form of records being labelled, describing how they will be created and what format must be followed. In a preferred embodiment, the records will be labelled and printed with their field in a strategic format called a datasheet. Datasheets are distributed to users to gather and prepare data for conversion. Completed datasheets will then become the basis for conversion specifications indicating what is required and from what source it can be obtained.

The data conversion component of the integrated implementation product is the component of the integrated implementation product most critical to assuring that the data presently existing in the user company is most efficiently utilized in connection with the new system and in maximizing the ability to convert data in an automated fashion where possible and to convert and organize in an efficient fashion where data must be converted from a manual system to an automated system.

7. Integration Phase

The seventh phase of the integrated implementation product development is the development of the links between the four components of the integrated implementation product. As described above, the training component accesses the same screens at each of the levels of the user component and has consistent levels. The only difference is that rather than providing a discussion and description of the modules, procedures, functions and screens shown in the user component, the training component provides tests designed to elicit the needed information from a potential user in connection with initial training or conference room pilot scenarios prior to going live with the new system on the one hand or, on the other hand, subsequent to the implementation of the system in connection with the training of a new employee or an employee whose job function has changed to include new responsibilities or procedures.

The links are set up so that the trainee can quickly and easily access the same procedure screens and report screens directly from the training component just as they are accessed from the user component. Likewise, the procedures and screens are identified with specific codes which allow the different components to quickly locate the relevant screens in each of the data, user and training components in a tightly woven fashion which allows the user to rapidly move among the three major components. In addition, the user, training and data components are tied to the plan component as associated tasks are input into the plan. For example, scheduling of training scenarios is a task in the plan. The user component allocation of tasks is reflected in the plan component template.

BENEFITS OF SEVEN PHASE DEVELOPMENT

Throughout all seven phases of the development of the integrated implementation product, the customer's management has an opportunity to review the progress of the development and provide its comments to insure consistency with the original objectives of the integrated implementation. In addition, where the customer, for whom the integrated implementation product is being developed, is the software developer, any changes and enhancements to the underlying computer system can be incorporated into the integrated implementation product by changes in the modelling and alteration of the related components by virtue of the links between the different systems. For example, if a process flow is being changed to include an additional procedure, the user documentation can be adjusted and from the user documentation one could quickly and easily fix the training and data conversion components.

B. THE INTEGRATED IMPLEMENTATION PRODUCT

In a preferred embodiment the completed product which is produced by the seven phase development approach described above is a four component integrated implementation product which is designed to run on a PC-based system, preferably in a graphical user interface based system. In one preferred embodiment each of the four components is adapted to run under the Microsoft Windows 3.0 ® or higher (a Microsoft computer operating system for IBM compatible DOS PCs), which allows users to access each of the four components from a basic integrated product menu of the type shown in FIG. 2.

The integrated implementation product used to implement a large-scale mainframe application can be run on a PC under the Windows environment with all four components apparent to the user at a single time to allow for flexibility of movement between the four components. Reference is made to FIG. 2, wherein a screen 810 including the plan, user, training and data conversion icons 811, 812, 814, 815, respectively, are shown. In addition, the ability to enter the actual software system with live system icon 813 or exit the system with exit icon 816 are provided. In accordance with either keyboard manipulation or mouse manipulation the four implementation components can be run directly from the screen of FIG. 2. The manner in which each of these components operates will be discussed first in a conceptual fashion and then with a review of the actual procedures to be followed by a user of these components.

1. The Plan Component

The Plan component, in a preferred embodiment is presented in connection with a higher level project management software package as a hierarchical plan template. Reference is first made to FIG. 3 wherein an early screen in the Plan Component, including summary phases of the implementation Plan are identified in Gantt Chart form. The implementation is broken into ten separate summary phase tasks. The summary phases are: 1. Pre-assessment; 2. planning and organization; 3. goals and objectives; 4. project team education; 5. current/new user environment; 6. hardware/software installation; 7. data conversion and testing; 8. user training/pre-production scenarios; 9. cutover planning/live operations and 10. post-assessment review.

Each of these summary phases is composed of a series of activities and tasks identified in the project management software as children, which together make up the summary phases. In some cases, the children activities are themselves composed of a series of subsidiary tasks identified as grandchildren tasks. The tasks are identified by name, number of days required to accomplish, starting and ending dates for the task and the effort required to complete the task expressed in the number of total worker days which are required to complete the task. Generally, the effort required for each summary, child or grandchild task is fixed but the number of days to complete the task and the starting and ending dates of the task depend upon the resources available to the implementing organization and the starting and ending dates of other tasks which must be completed prior to commencement of the relevant task. Often, if one employee must fulfill the activities of several expected workers, the actual time to complete the task may be greater than that for an organization which could allocate additional personnel to allow parallel performance of tasks to speed the implementation. In any event, the plan component is set up to address the efforts required to complete each task and then adjust the implementation schedule to the resources which are available and allocated. Management, after a review of a preliminary plan may determine that the assignments of an additional personnel in the implementation project would meaningfully speed the implementation and elect to allocate such personnel at various junctures to avoid bottlenecks and to speed the overall implementation.

Figure 4:
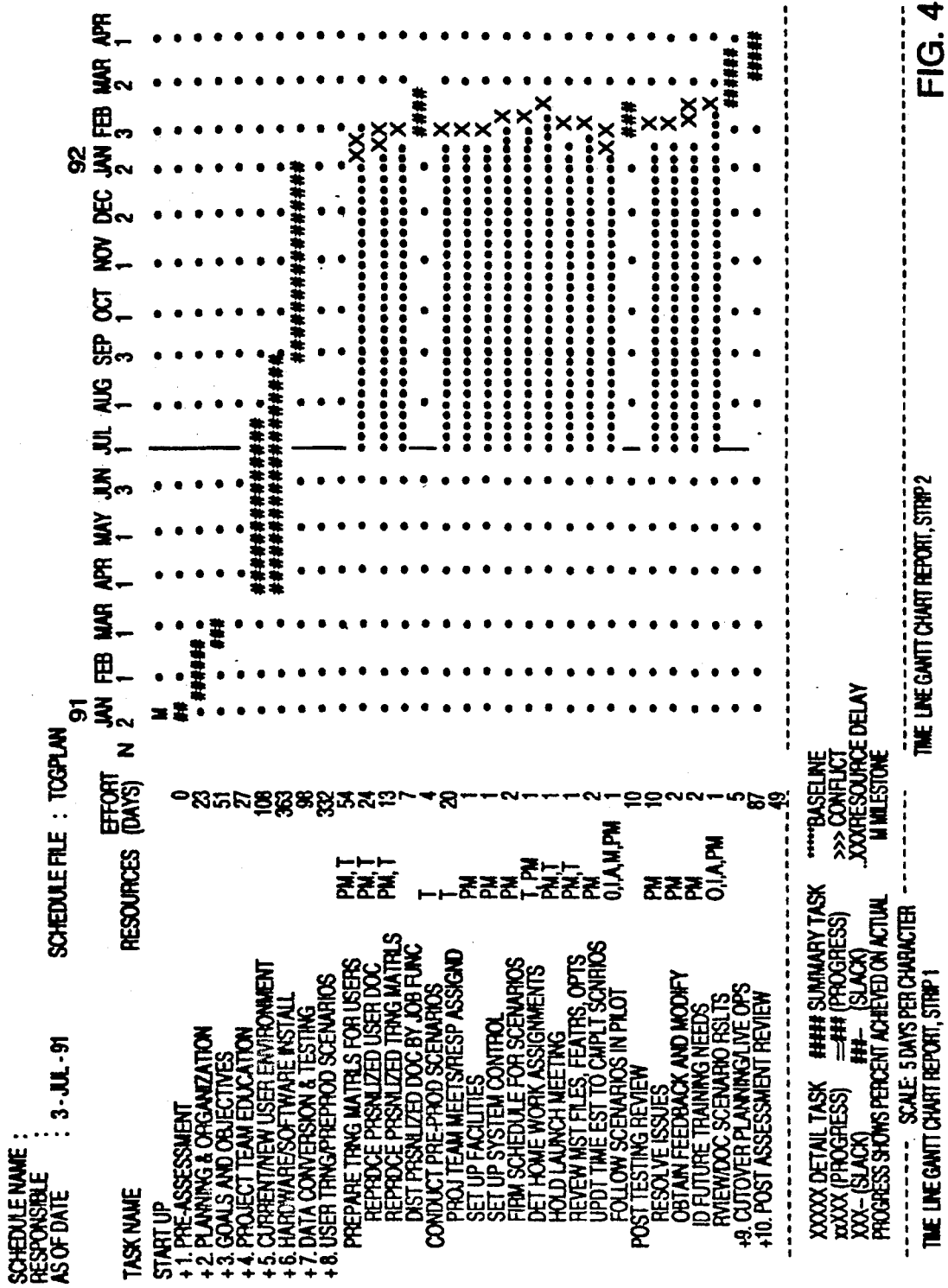
FIG. 4 is a summary Gantt Chart similar to FIG. 3 with the eighth phase expanded in accordance with a preferred embodiment of the invention.

Reference is next made to the FIG. 4 wherein an expansion of the existing phase, the user-training/pre-production scenarios is depicted. The user-training/pre-production scenarios summary phase is identified as a summary phase which is expected to take 26.1 days from Apr. 29, 1992 through Jun. 5, 1992 and require 54 effort days. The user training/pre-production scenarios summary is made up of three subsidiary activities. The first is directed to preparing training materials for users and is expected to take 12.1 days from Apr. 29, 1992 through May 15, 1992 and require 24 worker days. This activity is also a summary which is composed of three subsidiary tasks. The first task is reproduction of the personalized user documentation, which is expected to take 6.6 days from Apr. 29, 1992 through May 7, 1992 and require thirteen worker days of effort. The task has two resources assigned with it, PM which refers to the project manager and T which refers to the project team. As is readily apparent, each summary task includes the sum of the total days of effort required to complete the subsidiary tasks. In this case, the activity entitled prepare training materials for users is identified as requiring 24 days of effort. This is the sum of the three subsidiary tasks: reproducing personalized user documentation (13 days); reproducing personalized training materials (7 days); and distributing personalized documentation by job function (4 days). Likewise, the summary phase user training/pre-production scenarios, which is identified as requiring 54 days of effort, is merely the sum of the efforts required in the three subsidiary activities preparing training materials for users (24 days); conducting pre-production scenarios (20 days); and post testing review (10 days).

The specific tasks, resources, efforts, expected days to complete the project and the dependencies of the different tasks i.e. which tasks must be completed before other tasks may be commenced based upon the debriefing of program developers and, for greater accuracy, prior implementors of the application system. Some of the efforts can be adjusted downward if certain functionality related to a task is not to be implemented. This determination can be made by the implementation team as it proceeds in defining a customized implementation plan for the specific functionality utilized.

Figure 5:
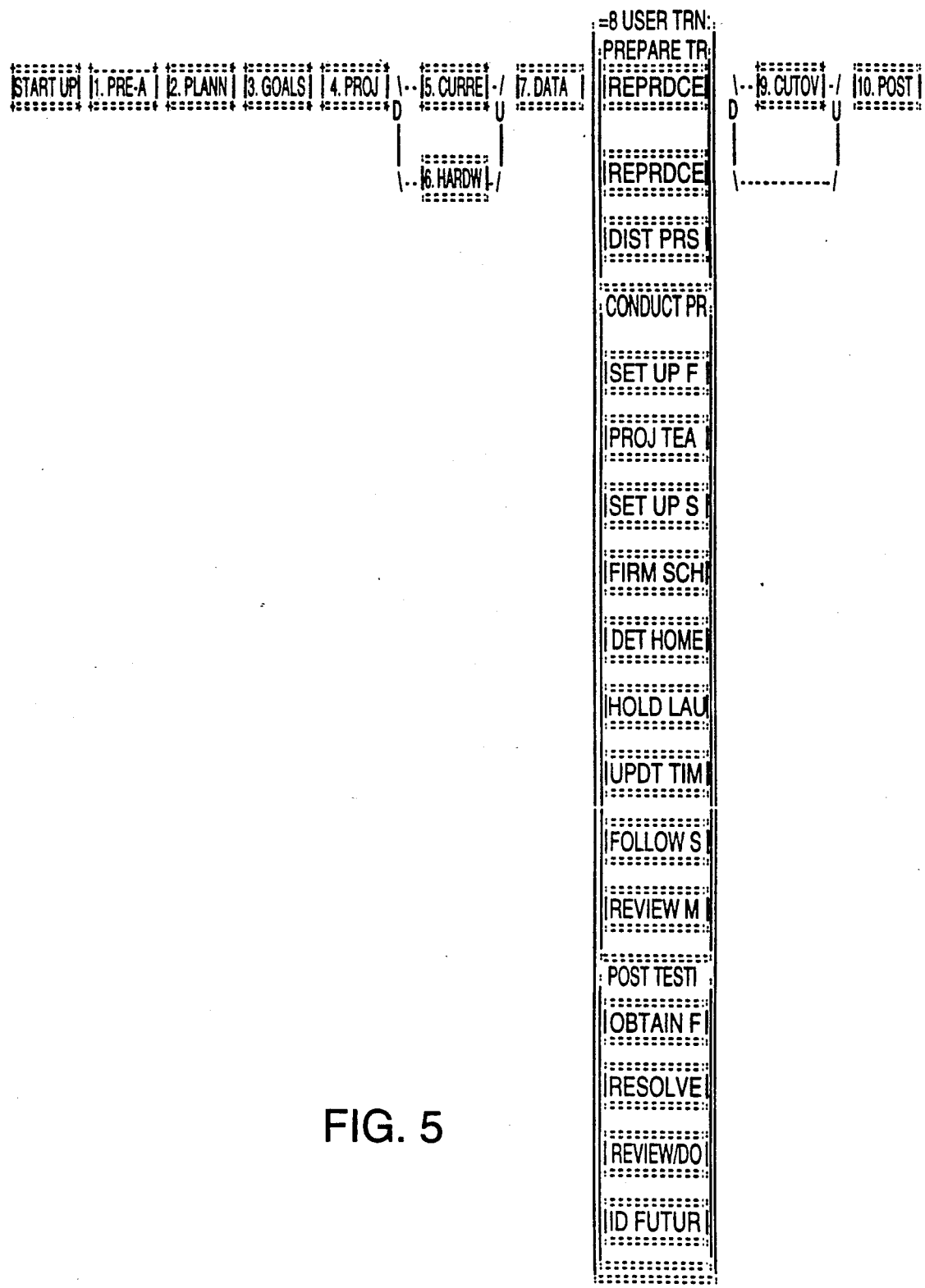
FIG. 5 is a summary PERT Chart with the eighth phase expanded similar to the chart of FIG. 4 in accordance with a preferred embodiment of the invention.

Reference is next made to FIG. 5 wherein a PERT chart is depicted. The PERT chart is designed to show the dependencies of various tasks. In this case, the PERT chart shows in summary form each of Phases 1 through 7 and 9 and 10. Only Phase 8, which is the user training phase is shown expanded. Each of the other phases shown in Summary form includes numerous activities and tasks. The three activities (Prepare Training Materials for Users, Conduct Pre-Production Scenarios and Post Testing Review) are shown in box form as each includes its own subsidiary tasks. On the PERT chart of FIG. 5 the names of the phases, activities and tasks are abbreviated or cut off to allow them to fit in boxes which all fit on one page. FIG. 4 includes the same phases, activities and tasks spelled out.

The user company would start with the generic plan component and then customize it to the particular resources which will be available and the functionality which is to be implemented. In addition, the management personal may get constant reports which both show the implementation plan as it evolves from a generic implementation plan to a customized plan tailored to the needs and the resources of the implementing organization and may evolve as management determines to reallocate resources in connection with the implementation.

In addition, the Plan component as it is customized allows management to then track the implementation against the expectation based upon the Plan. Again, management can determine if for some reason the Plan's expectations are not being met due to a resource bottleneck, appropriate reallocation of personnel resources can be made. At each stage, the Plan component can be updated and upgraded to take into account the changes and the implementation process.

Essentially the Plan component provides an implementing entity with the collective knowledge of the software developers and other implementing entities in connection with tasks which must be undertaken, the order in which the tasks must be undertaken, the time and personnel resources which will be necessary to complete each of the tasks and the wherewithal to keep track of the progress of the implementation as well as to plan future resources for the implementation process. To this is added the capacity to adjust to the specific needs and circumstances of the implementing organization and to adapt the plan from a generic organization implementation to the specific organization implementation as it selects the desired functionality, desired resources and desired implementation schedule. The planned component can be utilized to examine "what if" analyses under which management may seek to determine what resources it must allocate to the implementation project to complete implementation by a certain date.

2. The User Component

The user component provides information on the application system which is also provided by the training component. However, the focus of the user component is somewhat different. The User component provides three separate paths to reach the same screens at various levels of the hierarchy. Two of the paths provide the information by functional inquiries. The third path reaches the information through the organizational structure which is based on specific responsibilities. The training component provides yet a fourth path to the same screens.

The first two paths are reached by selecting the User component and then selecting the function box for the appropriate application software module. Next, the user can enter the next level by either viewing a listing of procedures related to each function within the module or view a process flow which shows the functional relationship of the processes related to the module. At this point the third path, through the organizational chart, which can be selected for the appropriate application software module, allows a user to determine, based upon his or her job function, which procedures are either performed or supervised by his or her job role. In addition, a manager can quickly determine which procedures are being performed by various subordinates. In addition, a user can quickly find the information required in connection with his or her use of the packaged application software after the packaged application software has been implemented by entering the user component through the organization route and selecting his or her job title, which will quickly identify each of the procedures for which the employee is responsible.

Rather than utilizing a voluminous and difficult to use set of manuals which cover all procedures in a purely functional arrangement, the organization of the user information into a structured hierarchy with an organizational entry path makes the information easily and rapidly accessible.

Figure 6:
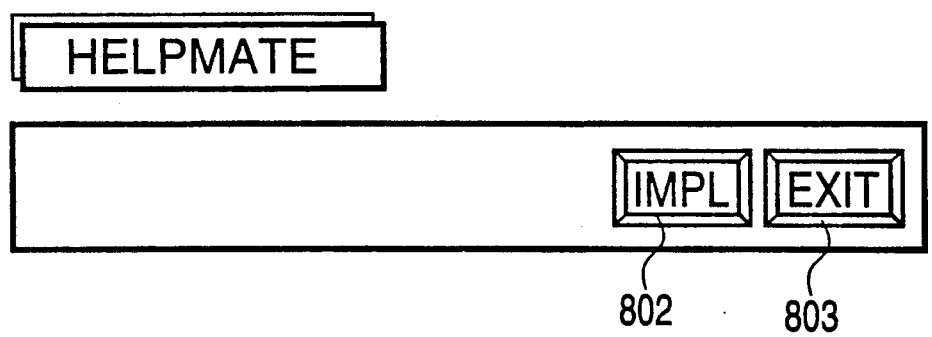
FIG. 6 is a graphical view of an entry screen in accordance with another preferred embodiment of the invention.

Reference is again made to FIG. 2 wherein the basic entry screen for the integrated implementation product is depicted. To enter the user component the curser is clicked on the User Doc icon 812. FIG. 6 shows an alternative entry screen which can be used prior to FIG. 2. FIG. 6 shows a first screen with buttons 802 and 803. Button 802 takes the user into the implementation product (FIG. 2). Button 803 takes the user out of the system.

Figure 8:
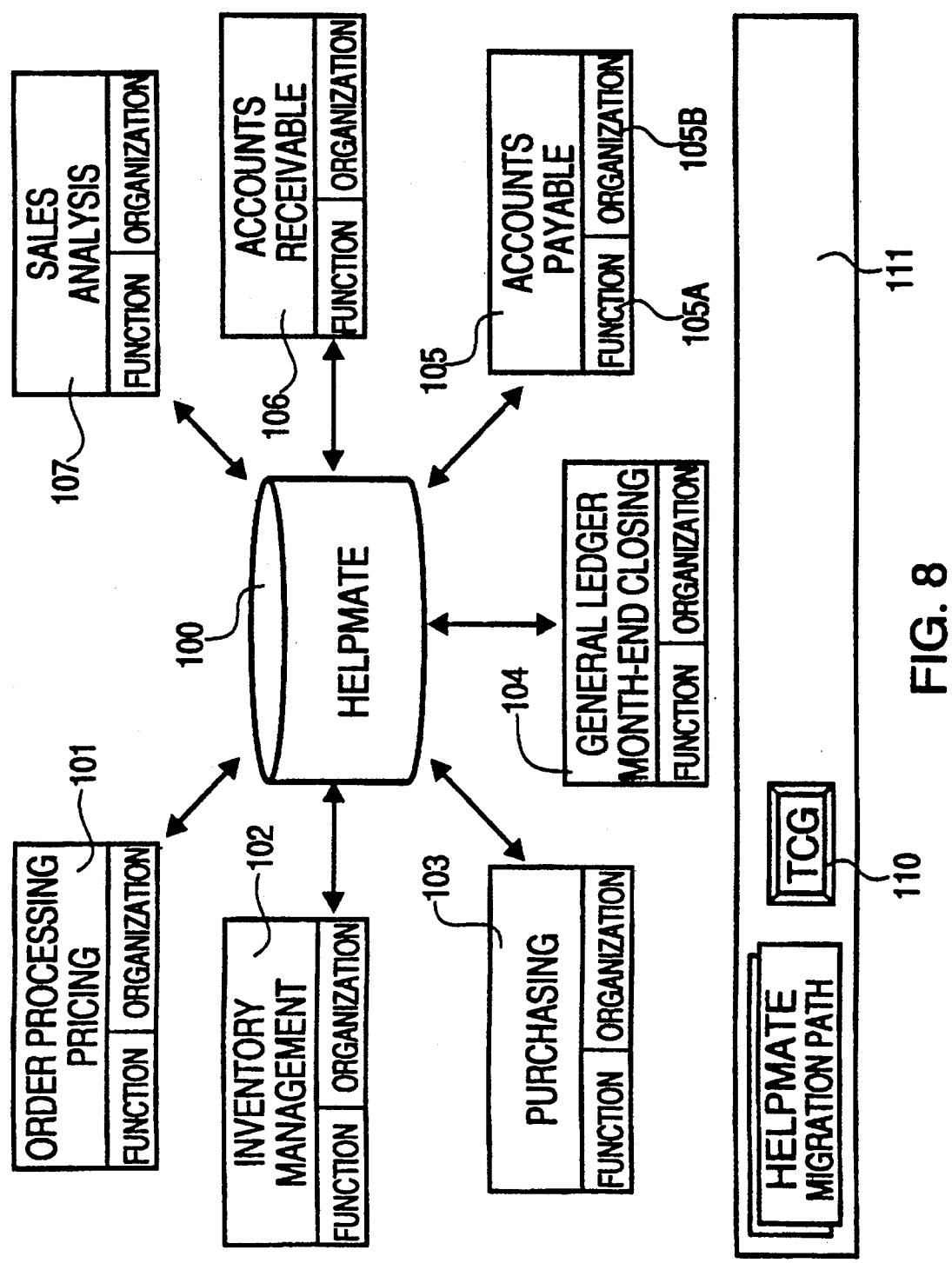
FIG. 8 is a graphical view of a menu screen in the user component in accordance with a preferred embodiment of the invention.

Reference is next made to FIG. 8 wherein the modules 101, 102, 103, 104, 105, 106 and 107 associated with application system 100 are depicted. The name Helpmate is used throughout the diagrams to represent the name of the system. Each of module boxes 101-107 includes a module title and function and organization boxes. In addition, the screen includes a migration path 111 at the bottom portion of the screen with an identified button 110 for navigating back to the entry screen of FIG. 2. The indication TCG is used to mark the button which will return the user to the basic screen of FIG. 2.

Figure 9:
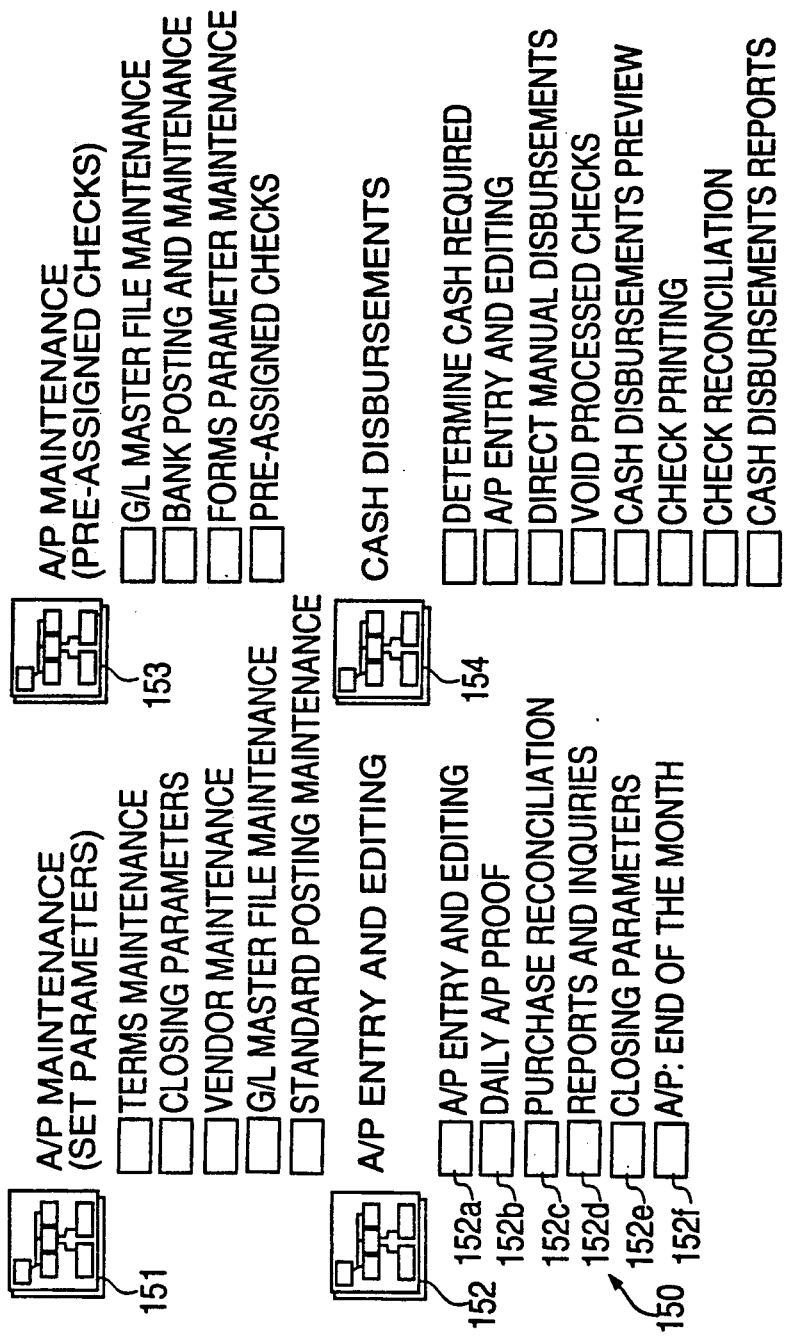
FIG. 9 is a graphical view of a third level menu screen in the user component in accordance with a preferred embodiment of the invention.

Reference is next made to FIG. 9 which is reached by clicking on function box 105a of accounts payable module 105. FIG. 9 is a third level screen which is identified as the functional capabilities for the accounts payable module. The screen of FIG. 9, like each of the other screens in the user and training components of the integrated implementation product, includes an active portion 150 forming the upper sections of the screen and a lower border including a migration path 111 back to the basic entry screen.

In this case, the functional capability screen includes the four functions or processes 151, 152, 153, 154 included within the accounts payable module. These four functions and processes include accounts payable maintenance 151 (setting parameters), accounts payable maintenance 153 (pre-assigned checks), accounts payable entry and editing 152 and cash disbursements 154. From the screen of FIG. 9, the user can either directly access the procedures which make up the function or process or may view a screen which graphically displays the function flow or process flow which incorporates the procedures listed beneath each of the functions or processes. And no matter which path is utilized the user would see the same procedures screens.

For users who already have an understanding of the process flow or function flow which they are reviewing and know which particular procedure they wish to see in greater detail, directly clicking on one of the procedures arranged under a function or process heading will shift the integrated implementation product to a fifth level where a screen in which a graphical flow chart of the particular procedure including relevant screens and reports are identified. Alternatively, by clicking on the process flow/function flow icon to the left of each function or process heading one gets a fourth level screen in which the procedures listed under the function or process heading are graphically arranged in a flow chart form which provides the user with a better understanding of the manner in which the procedures interact to perform the process or function to which they are related. Then, clicking on one of the procedures in the function flow or process flow chart diagrams brings the user to the same procedure flow chart screen as is obtained by directly selecting the procedure from the screen of FIG. 9.

Again, the migration path 111 forming the lower border of the screen of FIG. 9 allows the user to directly return to either the entry user component screen of FIG. 8, which includes the modules associated with the application software, by clicking on button 112 or to the basic integrated implementation product screen of FIG. 2 from which each of the four components can be selected by clicking on button 110.

Figure 10:
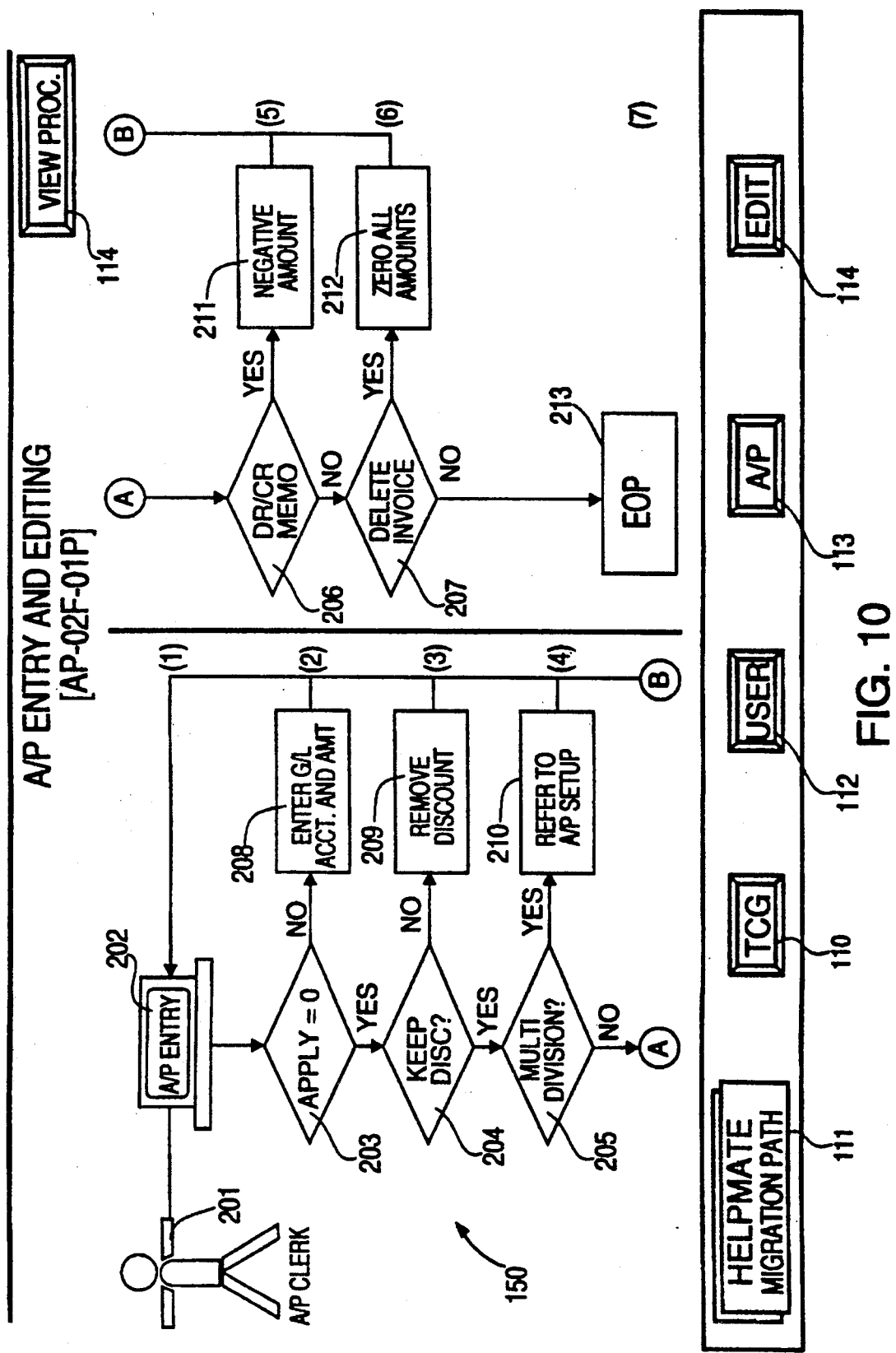
FIG. 10 is a graphical view of a fifth level flow chart diagram in the user component in accordance with a preferred embodiment of the invention.

By selecting the procedure 152a in the accounts payable entry and editing process 152, one advances directly to a fifth level procedure shown in FIG. 10 bypassing the fourth level entirely. The second path, described below, reaches the fifth level by way of the fourth level procedure flow obtained by clicking on process 152. If one knows which procedure one is interested in, this step may be avoided.

Reference is made to FIG. 10 wherein the accounts payable entry and editing screen identified procedure AP-02F-01P is depicted. Again, the screen is divided into the active portion of the screen 150 forming the top portion and the lower border migration path 111 which here is expanded to allow the user to select buttons 110, 112, 113, 114 returning the user to any of the previous screens going back to the basic integrated implementation product entry screen. FIG. 10 depicts a flow diagram of the accounts payable entry and editing procedure. The procedure includes a human icon 201 identified as accounts payable clerk. Icon 201 is utilized at this level screen to identify by job title who would perform the procedure. In this case, the procedure includes screen icon 202 decision icons 203, 204, 205, 206 and 207 and activity icons 208, 209, 210, 211 and 212. To maximize space on the screen and for efficient descriptive information associated with the flow chart diagram, the active portion of the screen is divided into two separate vertically oriented portions of the flow chart diagram in a side by side fashion. The circles marked A and B at the bottom of the left column and the top of the right column are the connections of the procedure so that flow A at the bottom of the left column continues at A at the top of the right column. Box 213 marked EOP means end of procedure. From the screen of FIG. 10 the user can press the button 215 entitled View Proc (procedure) at the upper right of the screen or click on screen icon 202 (to view the actual Accounts Payable Entry screen).

Figure 11:
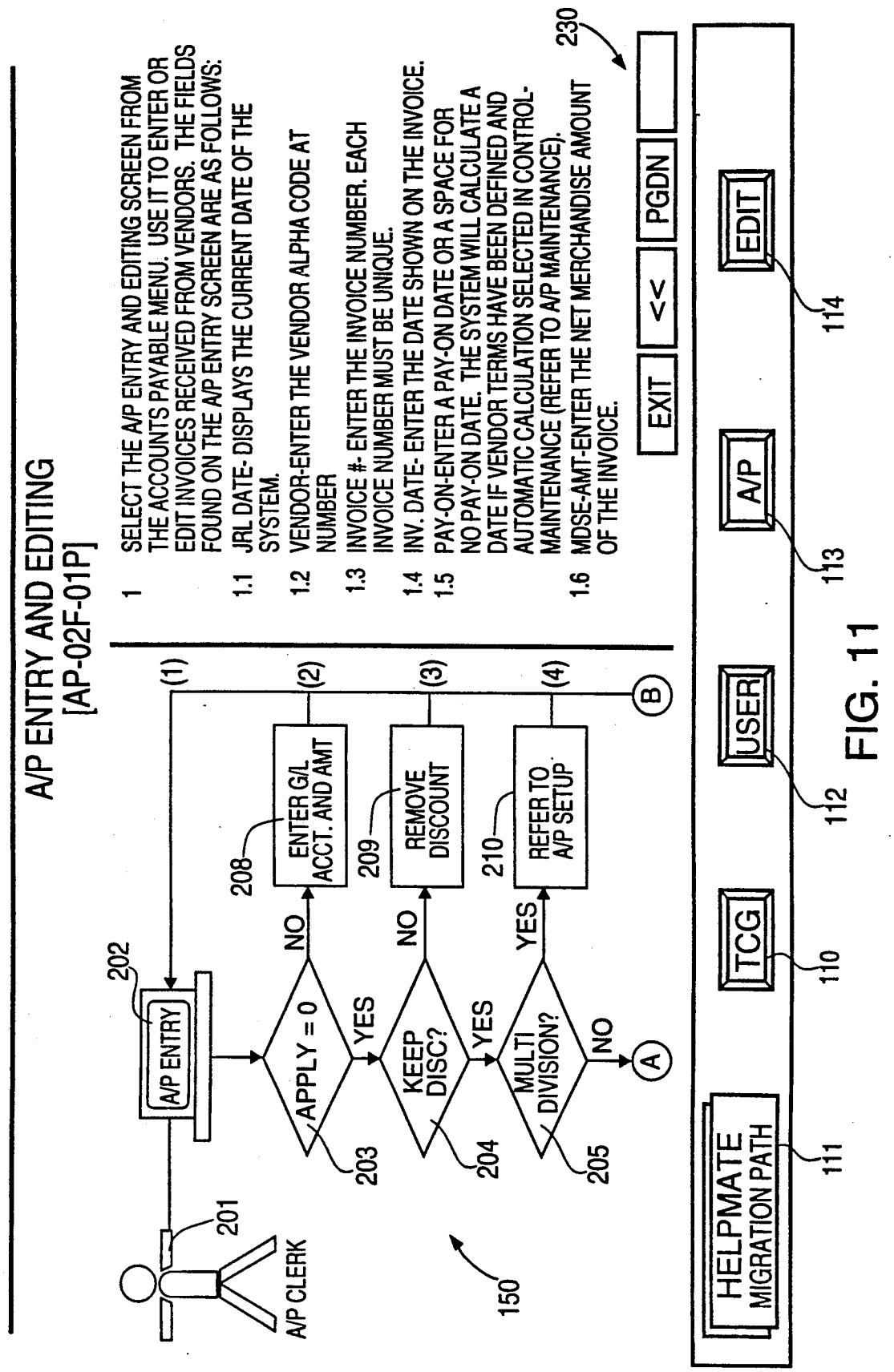
FIG. 11 is a graphical view of a procedure screen in the user component with graphics and explanatory text in accordance with a preferred embodiment of the invention.

Reference is next made to FIG. 11 wherein the screen produced by selecting view procedure button 215 is depicted. This screen overlays a written description of the each of the steps involved in the procedure in a fashion which allows the user to learn about the steps of the procedure in detail. The screen of FIG. 11 includes an additional navigation portion 230 at the lower center of the superimposed written procedure steps. The additional navigation portion has provision for separate directional guides. The user may either exit from the written procedure level and return to the basic procedure flow diagram, select the double arrows left to remove the written overlay for the left half of the procedure flow chart diagram and instead overlay the written description of the procedure flow chart diagram on the right side over the procedure flow on the left, utilize a page down feature where the written portion for the procedure flow chart diagram exceeds one screen's worth of information and a page up guide to cycle upward in a multi-page written description of a flow chart diagram of the procedure. The Page Up box is blank as the procedure is on the first screen. If the written portion extends over several screens it may be necessary to move up or down through the written screens. Likewise, where the written description of the procedure flow chart diagram is present on the left side of the screen, the arrows point to the right and allow shifting of the written description to the other half of the procedure flow chart diagram. Again, the lower border of the screen includes a migration path 111 which is augmented to allow return to the fourth level accounts payable screen, the basic user component screen or the integrated implementation product screen.

Figure 12:
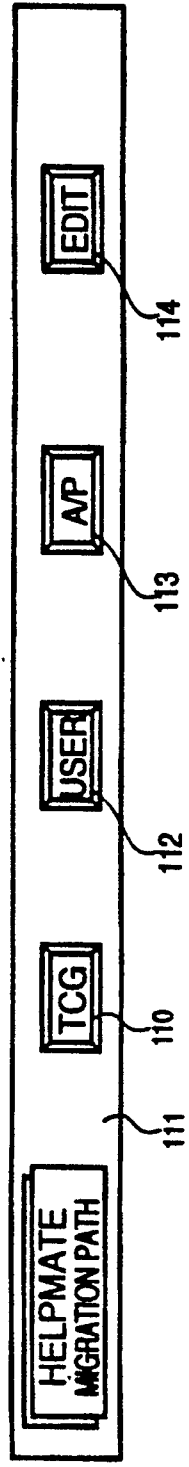
FIG. 12 is a graphical view of a sample application system screen in the user component in accordance with a preferred embodiment of the invention.

In addition to viewing the procedure as shown in FIG. 11, screen icon 202 in FIG. 10 may be selected and the actual screen 250 seen during the use of the application system can be directly viewed. Reference is next made to FIG. 12 wherein the actual accounts payable entry screen 250 that would be seen by the user in the operation of the program is depicted. The actual screen 250 can either be made as a dummy screen which can only be viewed, or it may be animated so as to allow entry of data in accordance with the procedure steps in the training component. In addition to migration path 111 at the lower border of FIG. 12, the screen also includes an overview button 251.

In this case, selecting overview button 251 overlays a written overview of the screen which appears as a message card (essentially, a level seven screen). In this case, the overview identifies that "the accounts payable entry and editing screen is used to enter vendor invoices into the accounts payable system." It also notes that "one can select this screen from the accounts payable menu." The overlay includes a suitable icon for removing the overlay and returning to the basic screen display of FIG. 12.

Figure 13:
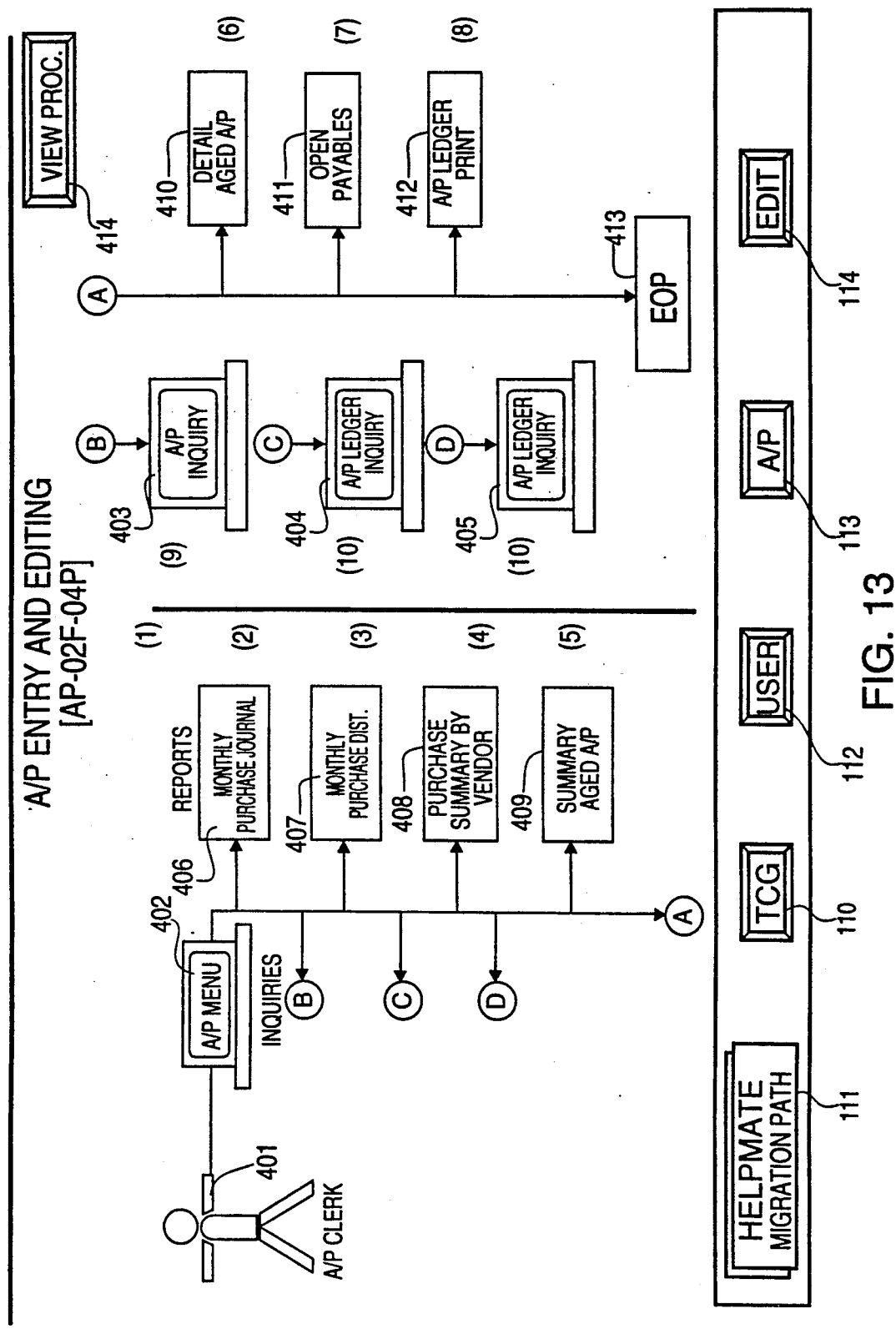
FIG. 13 is a graphical view of a procedure screen in the user component in accordance with a preferred embodiment of the invention.

Next, by selecting the accounts payable button 113 in the migration path of FIG. 12, the user component returns to the basic function and process screen of FIG. 9. Here, by selecting reports and inquiries procedure icon 152d the user component moves to the screen of FIG. 13. FIG. 13 includes a personnel icon 401 which is identified as the accounts payable clerk. Here, the procedure includes a series of screen icons 402, 403, 404 and 405, report icons 406, 407, 408, 409, 410 and 411, activity icon 412 and end of procedure icon 413. By selecting the purchase summary by vendor report icon 408, one views an actual purchase summary by vendor report.

Figure 14:
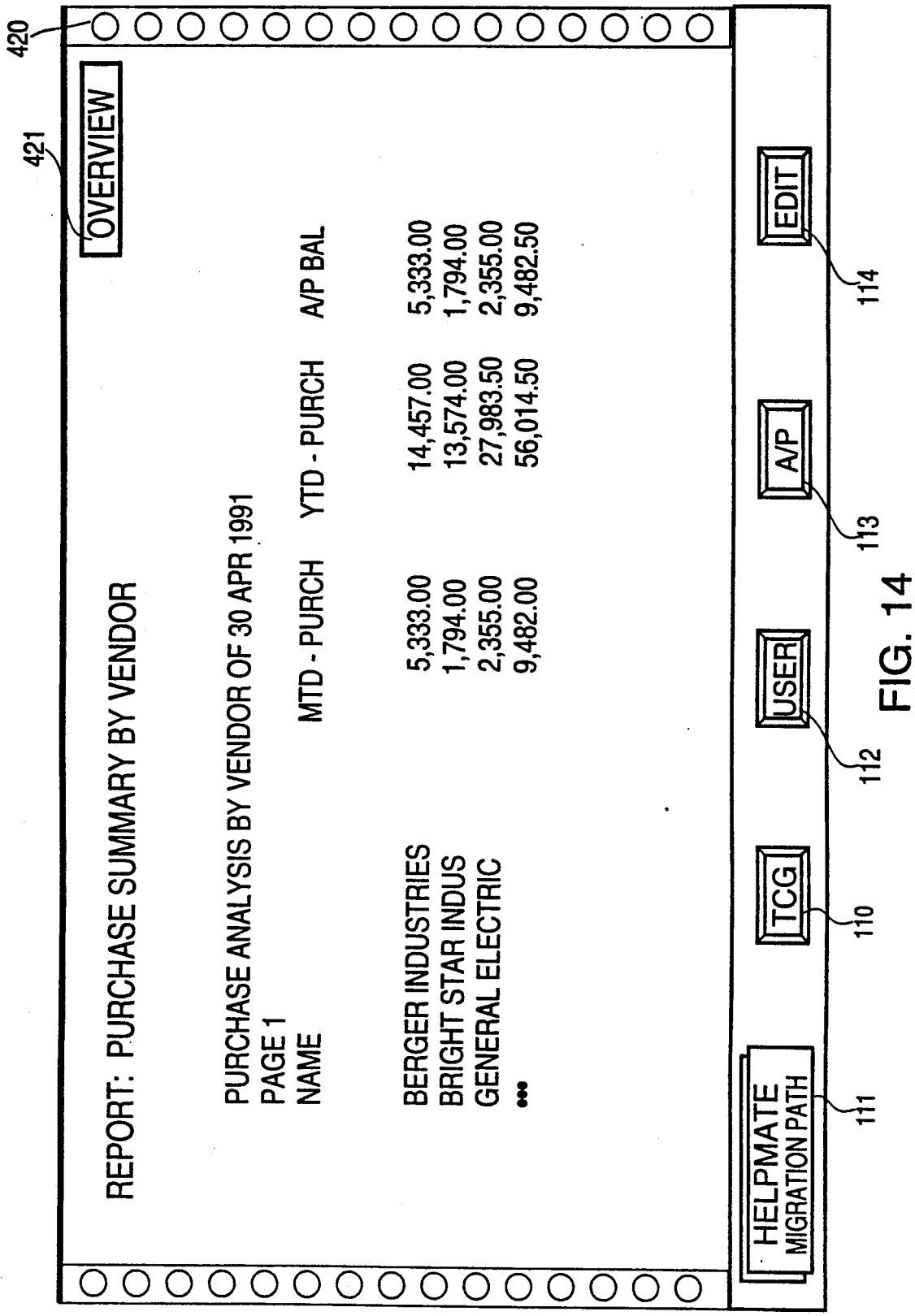
FIG. 14 is a graphical view of a report screen in the user component in accordance with a preferred embodiment of the invention.

Reference is next made to FIG. 14 wherein the purchase summary by vendor report is depicted. The upper portion of FIG. 14 includes a mock-up 420 of the actual purchase summary by vendor report which might be printed out in a representative application. Again, the screen of FIG. 14 includes a migration path 111 at the bottom of the screen which allows the user to rapidly and effectively return to any of the previous levels without having to access each of them in reverse order. Finally, FIG. 14 includes an overview icon 421. Overview icon 421, if selected, provides an overview card which is overlaid over the report on the screen. In this case, the overview identifies that the "purchase summary report lists all vendors with their associated purchases and payables balances." The overview further identifies that "you would select this report from the accounts payable menu." The overview card also provides an icon for removing the overview overlay and returning to the basic screen of FIG. 14.

This describes the first path that a user can utilize to reach the procedures screens and report screens of the integrated implementation product. By selecting the accounts payable button 113 in the migration path border 111 of FIG. 14 the user component returns to the screen of FIG. 9 which includes the functional capabilities of the accounts payable module. Here, by selecting the process flow icon 152 for accounts payable entry and editing, one obtains a graphical flow chart diagram (FIG. 15) of the accounts payable entry and editing process including each of the procedures listed on the screen of FIG. 9 under the accounts payable entry and editing function heading.

Figure 15:
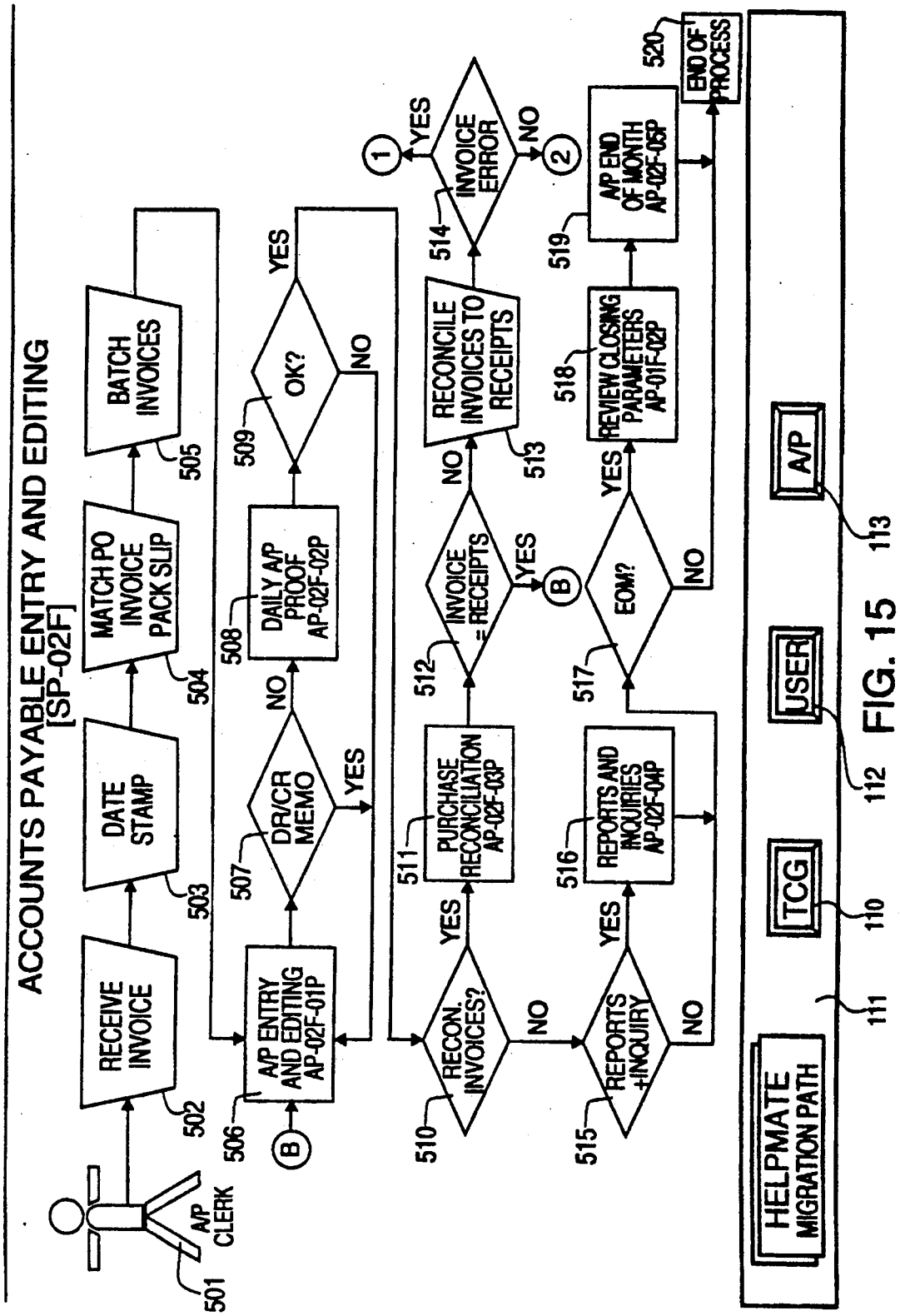
FIG. 15 is a graphical view of a fourth level process screen in the user component in accordance with a preferred embodiment of the invention.

Reference is next made to FIG. 15 wherein the accounts payable entry and editing process flow is depicted. The screen of FIG. 15 includes a personnel icon 501 which identifies that the activities in the process are carried out by the accounts payable clerk. The process flow includes task icons 502, 503, 504, 505, procedure icon 506, decision icon 507, procedure icon 508, decision icon 509, decision icon 510, procedure icon 511, decision icon 512, task icon 513, decision icon 514, decision icon 515, procedure icon 516, decision icon 517, procedure icon 518, procedure icon 519 and end of process icon 520. This detailed process flow chart diagram highlights the fashion in which the six procedures 512a, 512b, 512c, 512d, 512e and 512f under the accounts payable entry and editing process heading 512 in FIG. 9 fit within the accounts payable entry and editing process. By selecting one of the procedure icons 506, 508, 511, 516, 518, 519 in FIG. 15, the user component shifts to the same fifth level screen which would result from selecting one of the procedures directly from the listing of procedures in FIG. 9 (such as FIGS. 10 and 13). The only difference in the screen would be the migration path. This approach forms the second, functionally based path to the procedures, screens and reports of the integrated implementation product.

Next, the user component returns to the screen of FIG. 8 by selecting the button 112 entitled User in the migration path 111. Reference is again made to FIG. 8. Here, by selecting the organization box 105b in the Accounts Payable module 105, rather than the Function box 105a previously selected, the user component shifts to a organizational chart (FIG. 16) which identifies the relevant organization of the company as it relates to the Accounts Payable module. A critical aspect of this path to the information is the ability of each employee to quickly identify his or her responsibilities and for management to see what responsibilities the application software places on manpower requirements in general and on subordinates who will have to be placed within the structure.

Figure 16:
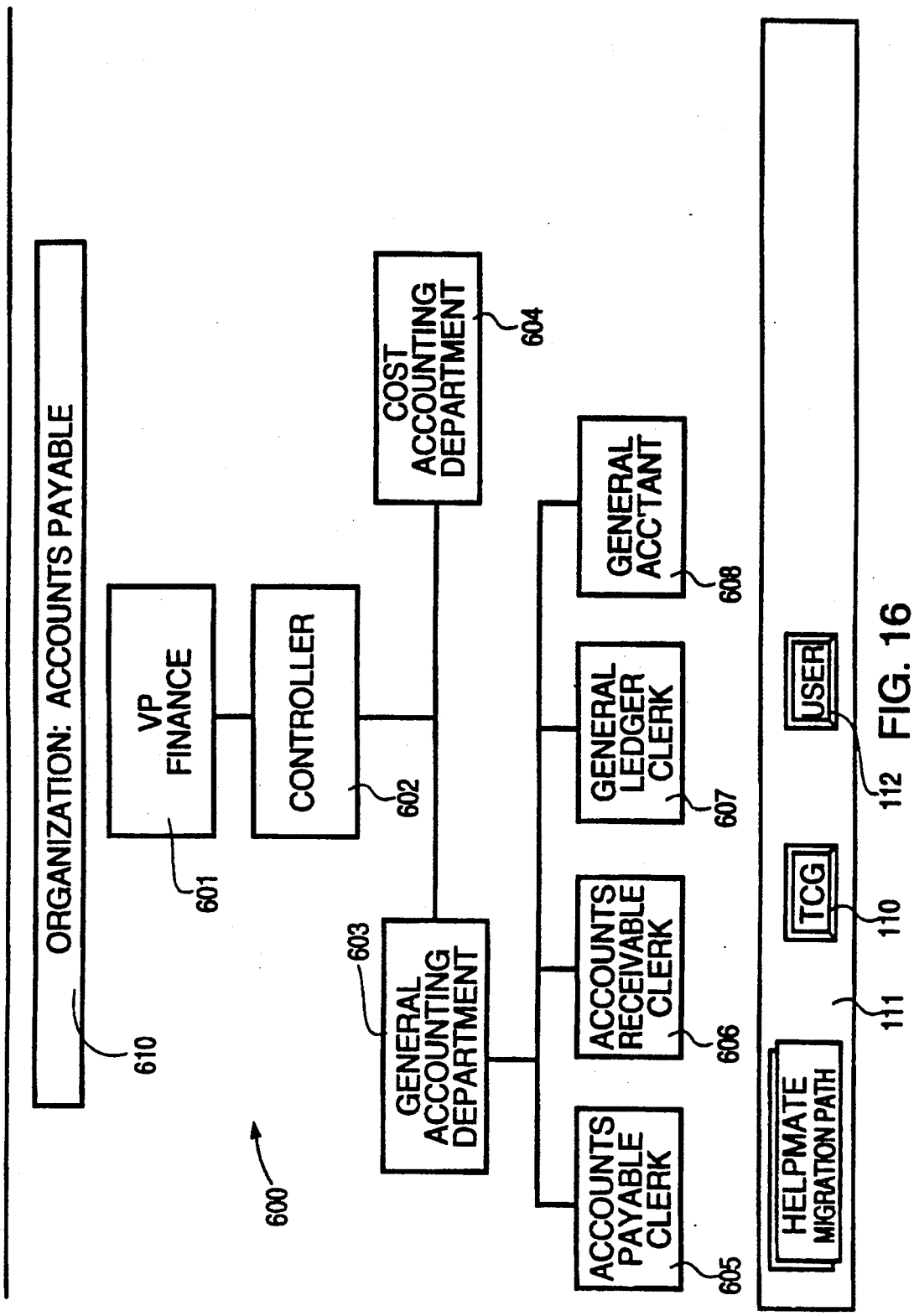
FIG. 16 is a graphical view of an organizational chart screen in the user component in accordance with a preferred embodiment of the invention.

Reference is next made to FIG. 16 wherein an organizational chart 600 of a generic organization related to the accounts payable module of the application system is depicted. The organizational chart 600 includes a title icon 610 and icons for a Vice President Finance 601, a controller 602, a general accounting department 603, a cost accounting department 604, an accounts payable clerk 605, an accounts receivable clerk 606, a general ledger clerk 607 and a general accountant 608. In this case, the Accounts Payable module only directly affects accounts payable clerk 605 and general accountant 608. As a result, only icons 605 and 608 are active. This is shown in the User Component by different color or shading of icons 605 and 608 in the User Component. By selecting the icon for the accounts payable clerk 608 the User Component displays a job description which identifies primary responsibilities, primary computerized procedures and primary manual procedures which are implemented by the accounts payable clerk.

Reference is next made to FIG. 17 wherein a job description screen 700 for an accounts payable clerk in accordance with the invention is depicted. FIG. 17 includes a primary responsibility section 701, primary computerized procedures section 702, primary manual procedures section 703, and a migration path area 111. This allows a manager to immediately identify the responsibilities of each subordinate. Each of the primary computerized procedures 705, 706, 707, 708, 709, 710 may be selected. Selection of the accounts payable entry and edit computerized procedure from this screen will produce the same screen as in FIG. 10 except that the migration path will include a button identified as JOB which will return the user to this job description screen. In this case, the primary computerized procedures for the accounts payable clerk are the same six procedures which were reached through the functional branch of the User component. Of course, depending upon the responsibilities of a particular job title, the computerized procedures involved within a job title may not coincide as precisely with the functional specification. For example, management employees may exercise supervisory control over more than one process or function within their areas of management control.

Thus, a user can reach the same procedure and screen information four ways. Three have already been described, the fourth will be described below in the Training Component section. The screen can be accessed through the two user-function chains, through the user-organization chain or through the training component. What is most important is that the user, whatever his or her limitations in connection with knowledge of the system, can find the transactions and procedures which are his or her responsibility and/or the responsibilities of subordinates or, even superiors, within the organizational structure in a logical and straightforward fashion.

3. The Training Component

Reference is again made to FIG. 2 wherein the basic screen for the integrated implementation product is depicted. In this case, the user will be involved in a training program, either as a portion of the actual implementation of the product which includes employee training, as an employee is hired after the implementation of the product, or as an employee whose job function has shifted and must now learn the new responsibilities and activities associated with his or her new job title. To enter the training component from the screen of FIG. 2 one selects the training icon 814.

Figure 18:
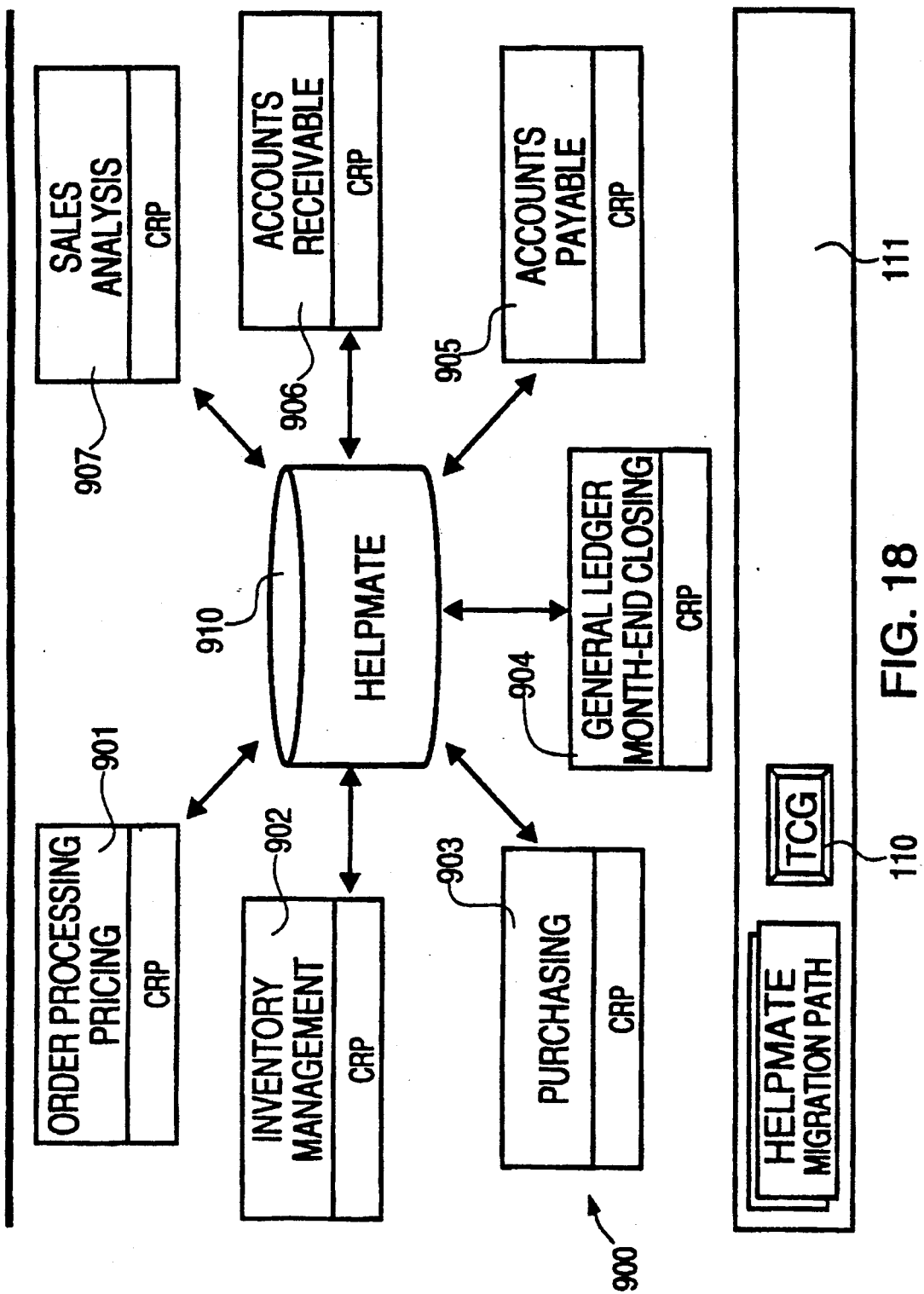
FIG. 18 is a graphical view of a second level menu screen in the training component in accordance with a preferred embodiment of the invention.

Reference is next made to FIG. 18 wherein a second level screen generally indicated as 900 which forms the basic Training component of the integrated implementation product in accordance with the invention is depicted. Screen 900 includes a central Training component system icon 910 and module components 901, 902, 903, 904, 905, 906 and 907 which represent the modules in the application system which are implemented. Each of the module icons includes an active CRP, or conference room pilot, section which is used to commence the training component for the designated module. Here, by selecting accounts payable module 905 the Training component moves to a screen (FIG. 19) in which various training scenarios for the accounts payable module are shown.

Figure 19:
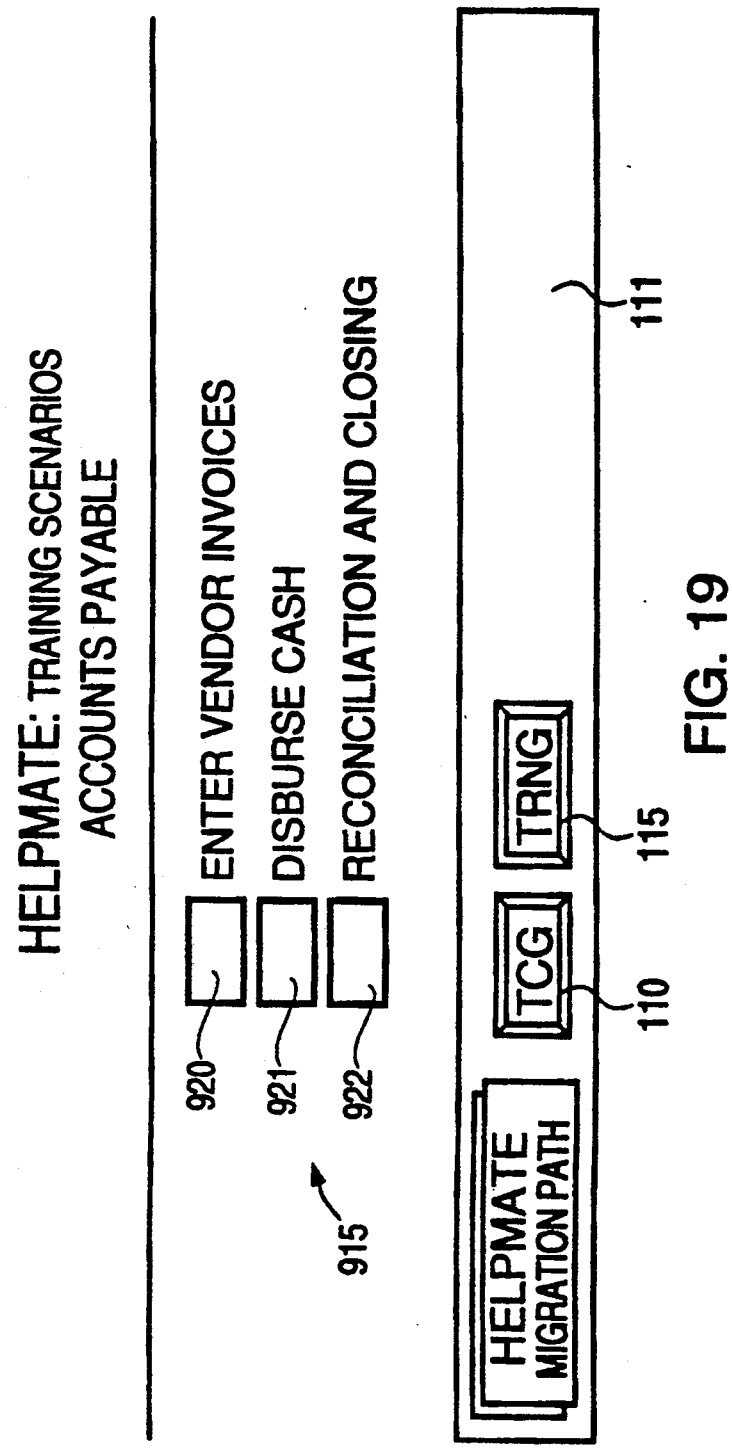
FIG. 19 is a graphical view of a third level menu screen in the training component in accordance with a preferred embodiment of the invention.

Reference is made to FIG. 19, wherein a training scenario screen 915 for the accounts payable module in accordance with the invention is depicted. Screen 915 includes three training scenarios 920, 921 and 922. By selecting enter vendor invoices icon 920, the user advances to a training screen (FIG. 20) which identifies the learning steps required to master the entry of the vendor invoices and the associated procedures.

Figure 20:
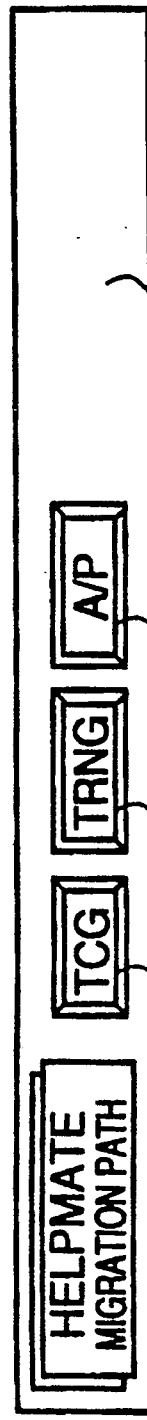
FIG. 20 is a graphical view of a fourth level menu screen in the training component in accordance with a preferred embodiment of the invention.

Reference is made to FIG. 20 wherein an accounts payable vendor invoices entry screen 930 is depicted. FIG. 20 includes fourteen steps which are required to be learned to perform the entry of vendor invoices. Associated with all but the most basic tasks are procedure identifications. For example, to learn more about the entry of a vendor ID the trainee would select procedure AP-02F-01P by clicking on this procedure with a mouse or other pointing device. This immediately shifts the trainee to the procedure flow chart diagram of FIG. 10 previously described above.

This training component path provides the fourth way in which the same procedures, screens and reports can be accessed through the integrated implementation product. Depending upon the needs, skills, capabilities and inclinations of the user or trainee, the critical procedure screen and report information can be easily accessed. The only difference between the procedure flow diagram as accessed by the four different paths (two functional and one organizational within the user component and the training scenario path within the training component) is in the contents of the respective migration paths.

The Training component reverts to entry training component screen of FIG. 18 by pressing the TRNG (training) button 115 at the base of any of the screens which are being consulted. By selecting the CRP (conference room pilot) portion of purchasing icon 903 in FIG. 18 the Training component moves to a conference room pilot purchasing scenario screen (FIG. 21).

Figure 21:
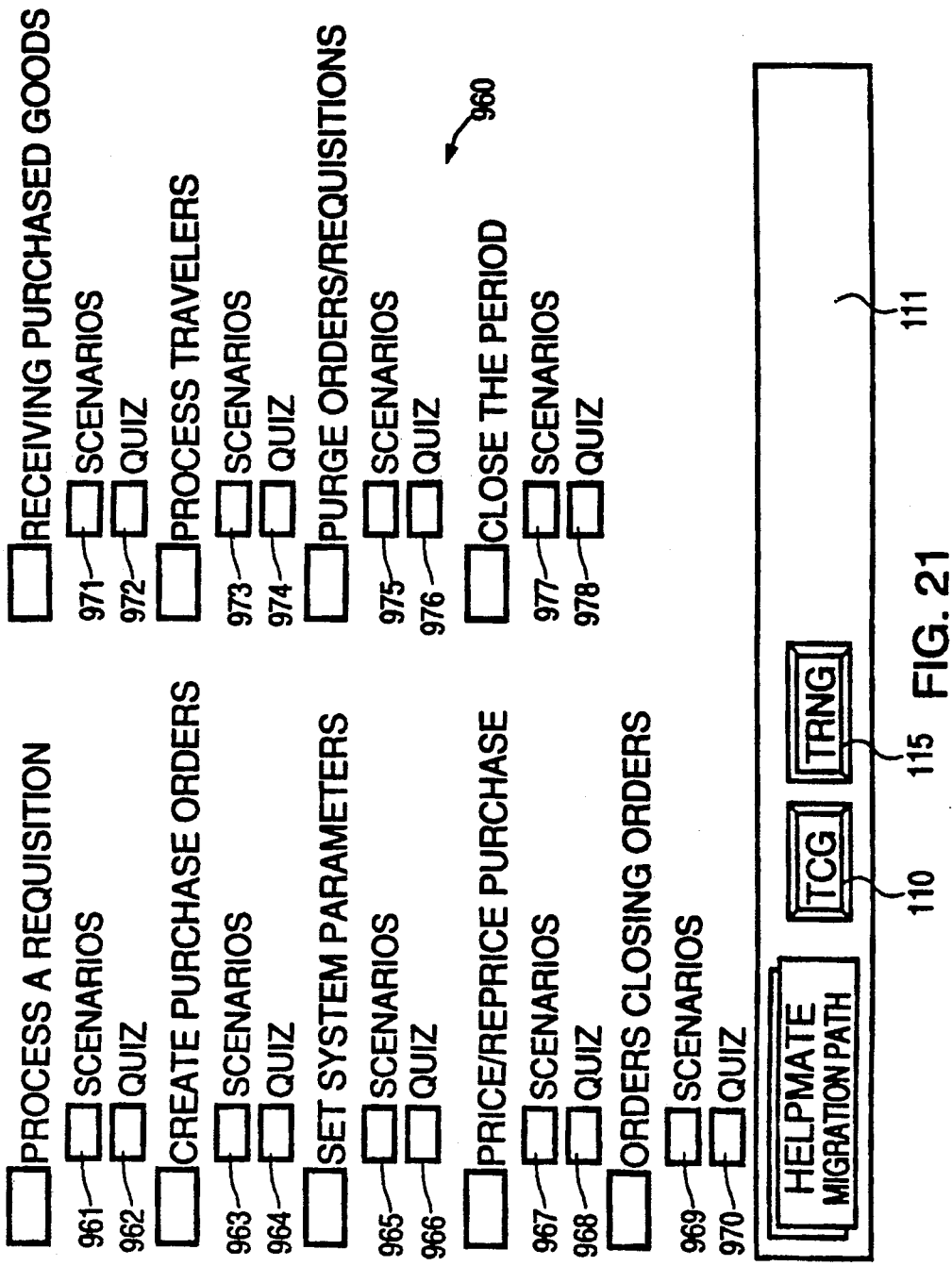
FIG. 21 is a graphical view of a third level menu screen in the training component in accordance with a preferred embodiment of the invention.

Reference is next made to FIG. 21 wherein a conference room pilot purchasing scenario screen 960 in accordance with the invention is depicted. Screen 960 presents an alternative approach to the training screen at this level. Selecting the scenarios icons 961, 963, 965, 967, 969, 971, 973, 975, 977 associated with one of the functions or processes identified within the purchasing module presents the same type of screens as described in connection with the accounts payable module and shown in FIG. 20.

Selecting the quiz icons 962, 964, 966, 968, 970, 972, 974, 976, 978 in connection with the process for requisite function enters the trainee into a short quiz which tests the trainee's knowledge in connection with the process or function and the various procedures included therein.

Figure 22:
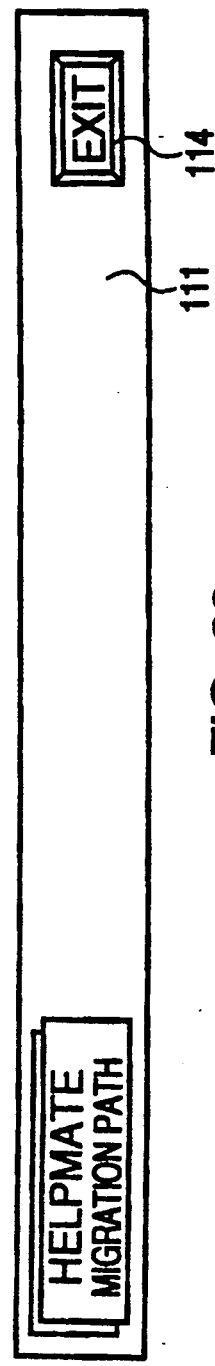
FIG. 22 is a graphical view of a fourth level quiz screen in the training component in accordance with a preferred embodiment of the invention.

Reference is made to FIG. 22 wherein a quiz screen 980 displayed upon selection of Quiz icon 962 in accordance with the invention is depicted. The quiz screen 980 presents a question and a limited number of possible answers to the question. Generally, a short grouping of between five and ten questions associated with each process or procedure is available. The number of questions included in the quiz can vary, depending upon the amount of material encompassed by the process and the criticality of the user's competency with the process, procedures, screens and reports to the accurate use of the system. Generally, once the quiz is completed, the training component will score the quiz and then ask the trainee whether they wish to review the procedure. If they answer yes to this question then the training component shifts directly to the procedure the user is being tested on.

The scores of the trainees of the quizzes in the training component may also be saved so that management may monitor the proficiency of the trainees in each of the relevant areas associates with their job functions. This feature may, of course, be disabled if desired.

The training component is tailored so that management can keep track of the performance of its various personnel during the use of the training component. This allows management to make a more informed decision concerning the ability of its employees to operate the relevant components of the software that they will be exposed to after the implementation of the packaged application software. Likewise, after implementation of the system new employees can be tested through the Training component with the quiz results indicating competency with relevant procedures.

D. DATA CONVERSION COMPONENT

Figure 23:
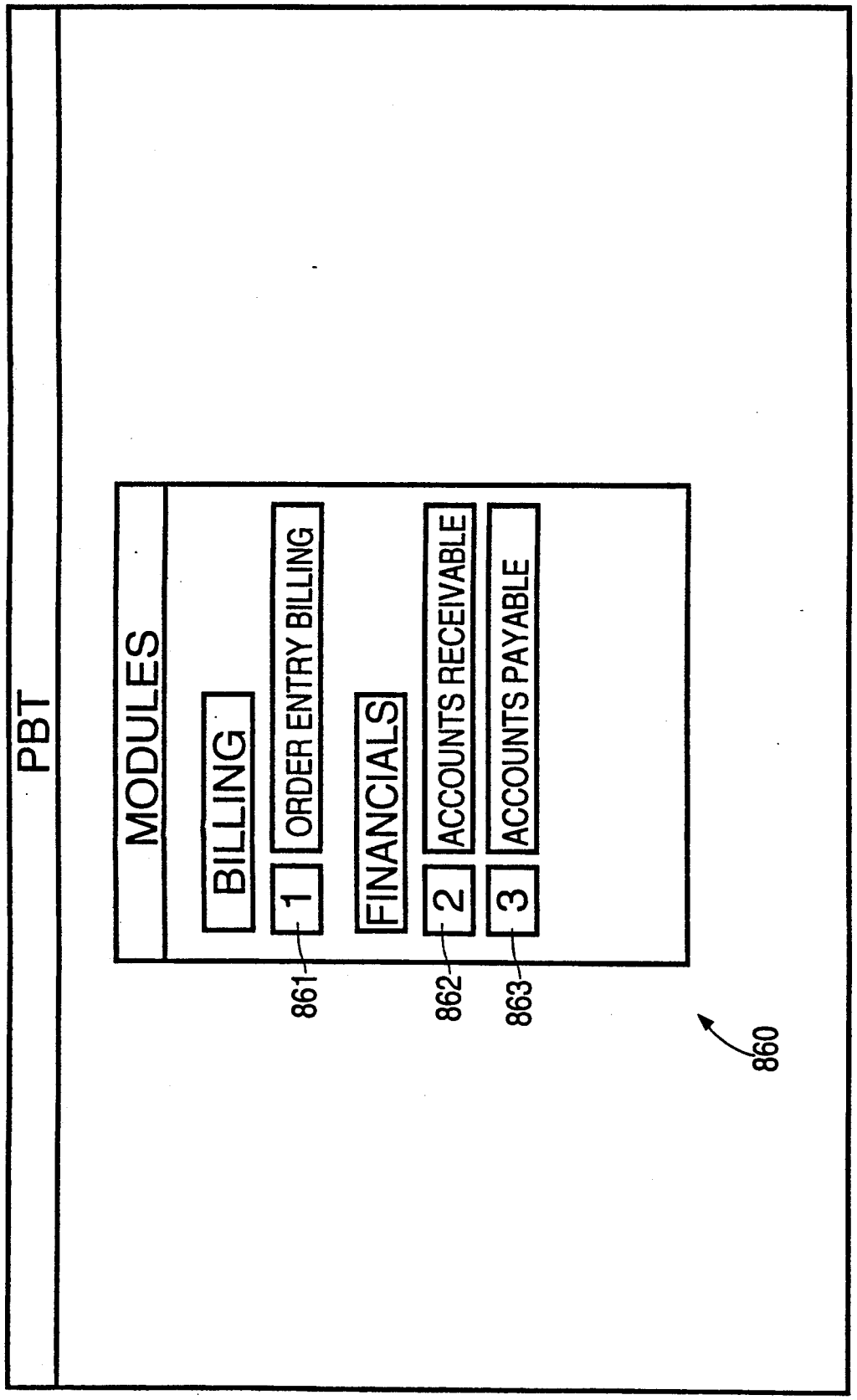
FIG. 23 is a graphical view of a second level screen in the data conversion component in accordance with a preferred embodiment of the invention.
Figure 24:
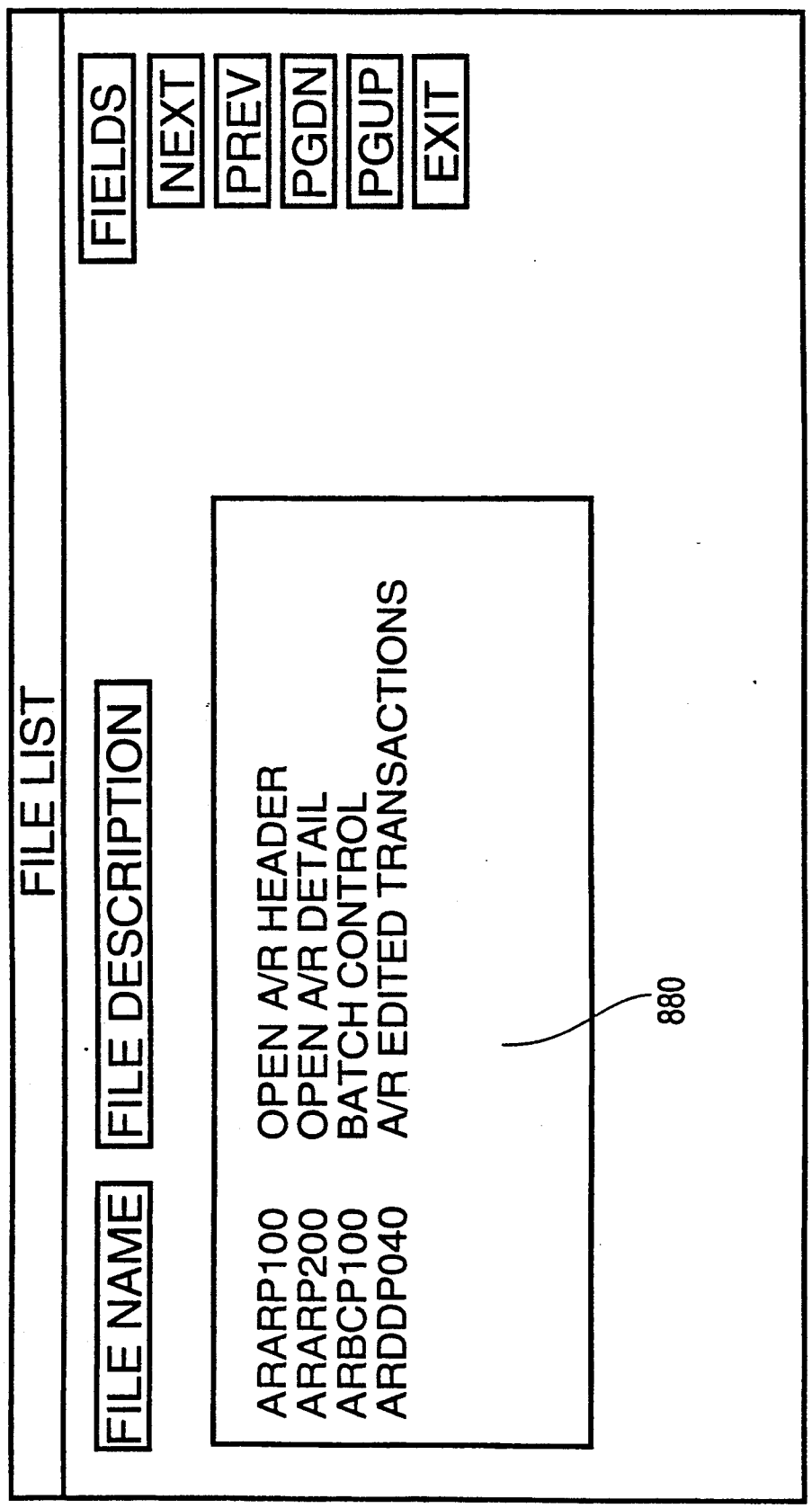
FIG. 24 is a graphical view of a third level screen in the data conversion component in accordance with a preferred embodiment of the invention.

Reference is again made to FIG. 2, wherein the basic screen showing the four component icons is shown. By selecting the data conversion icon 815, a components screen is presented (FIG. 23). The data components screen 860 shown in FIG. 23 is utilized to select the files and field information utilized in connection with the identified modules. For example, by selecting the accounts receivable components box 862 of the financials category and then opening a list of the files, one gets the listing of files involved in connection with this grouping of transactions (FIG. 24). Reference is next made to FIG. 24 wherein the accounts receivable transactions screen 880 includes four separate files for which the file name and a brief description is provided.

The data component of the implementation software is utilized primarily by the MIS department to determine what data is required by the new packaged application software for each of the selected functions and to compare this with the existing data structure of the organization. The data component allows the MIS department to compare the existing data structure on a file by file and on a field by field basis. Once the comparison of the needed data structure and existing data structure is completed the implementation software in the data component compares the existing data structure to the needed data structure to determine which files may be converted by batch processing techniques, which files must be converted from existing manual or paper records and which files and/or fields must be created in connection with the use of the new packaged application software.

By selecting the fields for the open accounts receivable header file a new screen, identified as FIG. 25, is shown. This screen, which is identified as the fields worksheet, identifies the name of the file and the number of fields presently in the file. Here, the file includes eighty-one separate fields and by selecting the page down icon the user can cycle through each of the eighty-one fields. For each field which is selected, the fields worksheet includes two windows. The first window on the left includes the field name, file, format, type of field, length of field, and the number of decimals, offset, whether the field is required, and whether it must be maintained. Additional data with respect to each field may also be included depending upon the type of files or fields involved. In practice, the MIS department, working field by field, would enter the data for the system which exists prior to the implementation of the new packaged application software in the second or right window.

A portion of the data conversion component generates a series of Datasheets which can be distributed by the MIS department to various departments to collect the information needed to be entered into the system. After the MIS department enters the current data (i.e., the data currently existing prior to the implementation of the new packaged application software), the data component automatically compares the file and field information with the current data to provide the MIS department with comparisons and recommendations regarding the viability of converting existing computer records to records which are useful in connection with the new system. This analysis is then reviewed by the MIS department, which can then make the final determination as to the data implementation plan and the need for manual conversion and creation of new data structures.

Accordingly, a process for developing an integrated implementation product, and an integrated implementation product and a methodology for implementing a application software package utilizing an integrated implementation product is provided.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An integrated system including a computer for implementing and using a software application system, comprising:

plan means for allocating resources to tasks and scheduling the implementation;

user means for documenting functional elements of the application system;

training means coupled to the user means for training users in the use of the functional elements of the application system;

data means for identifying data needs for the implementation of the application system and comparing an existing data structure with the data needed for implementing the application system; and coupling means, operatively coupled to the plan means, user means, training means and data means, for enabling movement within the integrated product between and among the plan means, user means, training means and data means;

whereby the integrated product organizes, schedules and controls the implementation of the application system and provides continuing user documentation and user training after the implementation is completed.

2. The integrated product of claim 1 wherein the user means provides access to procedures and processes by a functional access route and by an organizational access route.

3. The integrated product of claim 2 wherein the training means also provides access to the same procedures and processes as the user means.

4. The integrated product of claim 1 wherein the user means includes all features of the application software hierarchically organized into functions, processes, process flows and procedures in accordance with the work flow of users utilizing the application system.

5. The integrated product of claim 4 wherein the user means provides access to the hierarchically organized features of the application software by a functional access route.

6. The integrated product of claim 4 wherein the user means provides access to the hierarchically organized features of the application software by an organizational responsibility access route.

7. The integrated product of claim 4 wherein the training means provides access to the hierarchically organized features of the application software.

8. A method for developing an integrated system including a computer for implementing and using a software application system including a series of functions, each function including a series of processes, each process including a series of procedures, each procedure including a series of steps; said method comprising:

analyzing the software application system to identify each of the functions, processes, procedures and steps;

organizing the procedures associated with a process in accordance with the work flow of users utilizing the application system;

creating on the integrated system including a computer a series of process flows each graphically illustrating procedures and steps comprising a process;

indexing on the integrated system including a computer the procedures in accordance with the personnel responsible for or involved with performance of the procedure.

9. The method of claim 8 further comprising grouping process flows by personnel responsible for or involved with at least some part of the process flow.

10. The method of claim 9 further comprising grouping functions and processes by personnel responsible for or involved with at least some part of a function or a process.

11. The method of claim 8 further comprising organizing the functions, processes, procedures and steps by job responsibility so that employees may be trained in those functions, processes, procedures and steps which they are required to perform.

12. An integrated system including a computer for implementing and using an application system, comprising:

user means for documenting functional elements of the application system;

training means coupled to the user means for training users in the use of the functional elements of the application system; and coupling means, operatively coupled to the user means and training means, for enabling movement within the integrated produce between user means and training means;

whereby the integrated product organizes the implementation of the application system and provides continuing user documentation and user training after the implementation is completed.

13. The integrated product of claim 12 wherein the user means provides access to procedures and processes by a functional access route and by an organizational access route.

14. The integrated product of claim 13 wherein the training means also provides access to the same procedures and processes as the user means.

15. The integrated product of claim 12 wherein the user means includes all features of the application software hierarchically organized into functions, processes, process flows and procedures in accordance with the work flow of users utilizing the application system.

16. The integrated product of claim 15 wherein the user means provides access to the hierarchically organized features of the application software by a functional access route.

17. The integrated product of claim 15 wherein the user means provides access to the hierarchically organized features of the application software by an organizational responsibility access route.

18. The integrated product of claim 15 wherein the training means provides access to the hierarchically organized features of the application software.

* * * * *